United States Patent [19]

Batruni

[11] Patent Number: 5,872,809
[45] Date of Patent: Feb. 16, 1999

[54] METHODS AND APPARATUS FOR A COMMON DENOMINATOR TRANSCEIVER DESIGN FOR DATA TRANSMISSION

[75] Inventor: Roy George Batruni, Fremont, Calif.

[73] Assignee: ControlNet, Inc., Campbell, Calif.

[21] Appl. No.: 760,666

[22] Filed: Dec. 9, 1996

[51] Int. Cl.[6] .............. H04B 1/38; H04B 17/02; H04B 1/56; H04B 3/36
[52] U.S. Cl. .............. 375/219; 375/211; 375/257; 370/274; 370/276; 370/293
[58] Field of Search .................. 375/219, 258, 375/220, 257, 211; 370/274, 276, 293, 425, 446, 466, 378; 395/500

[56] References Cited

U.S. PATENT DOCUMENTS

| | | | |
|---|---|---|---|
| 5,432,775 | 7/1995 | Crayford | 370/231 |
| 5,541,957 | 7/1996 | Lau | 375/258 |
| 5,636,214 | 6/1997 | Kranzler et al. | 370/438 |
| 5,651,001 | 7/1997 | Alvstad et al. | 370/276 |
| 5,673,254 | 9/1997 | Crayford | 370/231 |

*Primary Examiner*—Chi H. Pham
*Assistant Examiner*—Khai Tran
*Attorney, Agent, or Firm*—Beyer & Weaver, LLP

[57] ABSTRACT

A transceiver for exchanging data with a transmission channel using any of the 100BaseT2, 100BaseTX, or 100BaseT4 standards, which includes a receive circuit for receiving analog data from the transmission channel. The receive circuit includes a first switch and a first analog-to-digital converter coupled to the first switch. The receive circuit further includes a second analog-to-digital converter coupled to the first switch. There is further included a second switch coupled to the first analog-to-digital converter and to the second analog-to-digital converter. The analog data is switched by the first switch into the first analog-to-digital converter and the second analog-to-digital converter to allow the first analog-to-digital converter and the second analog-to-digital converter to support sampling requirements of any of the 100BaseT2, the 100BaseTX, or the 100BaseT4 standards.

45 Claims, 15 Drawing Sheets

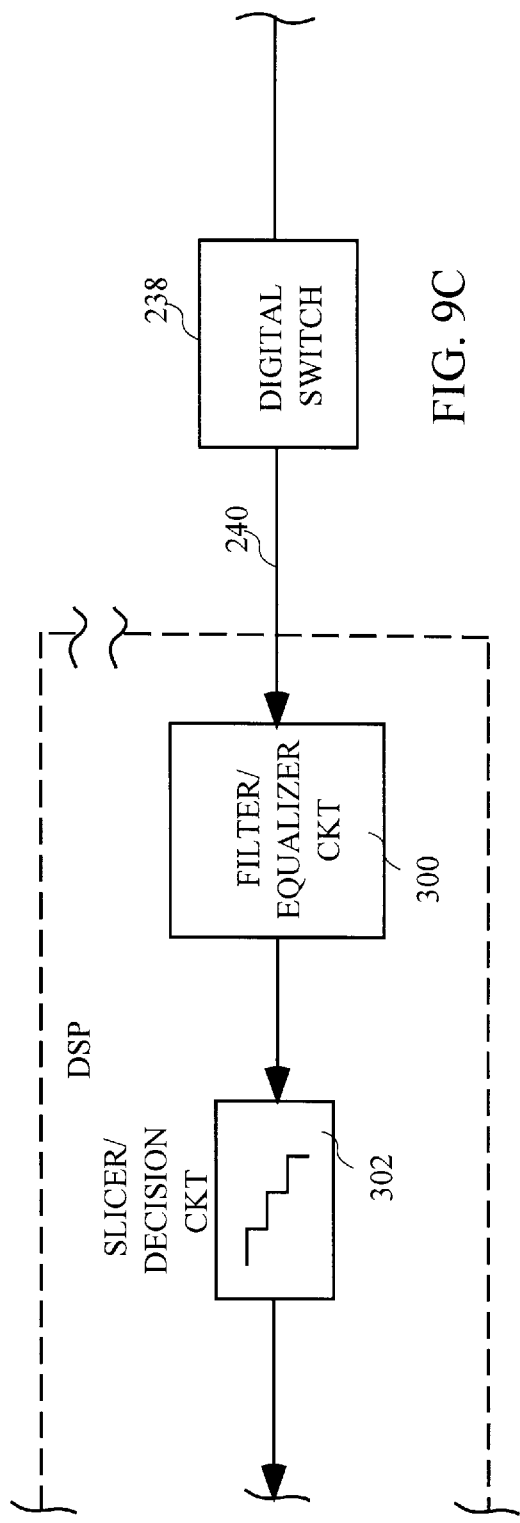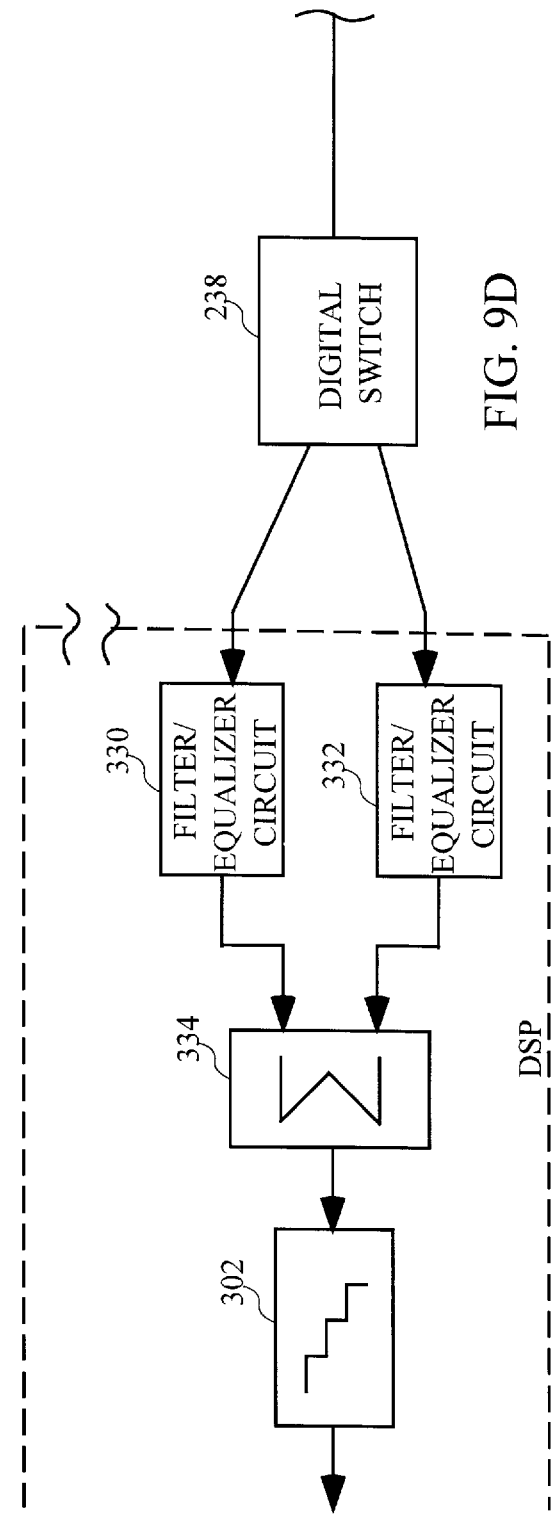

5,872,809

METHODS AND APPARATUS FOR A COMMON DENOMINATOR TRANSCEIVER DESIGN FOR DATA TRANSMISSION

BACKGROUND OF THE INVENTION

The present invention relates to methods and apparatus for data transmission. More particularly, the invention relates to architectures and techniques for implementing a common transceiver design that enables data transmission in any of the three standards: 100BaseT2, 100BaseTX, and 100BaseT4.

In modern data networks, e.g., computer networks, there exist multiple standards for data transmission. There are, for example, currently three standards for transmission of 100 Megabits per second (Mbps) over copper twisted pairs up to a length of 100 meters in an Ethernet Carrier Sense Multiple Access with Collision Detection (CSMA/CD) local area network. These standards are 100BaseT2, 100BaseT4, and 100BaseTX. Each of these standards has its advantages and disadvantages. For example, the 100BaseTX standard permits the use of lower cost circuitry over more expensive wiring while the 100BaseT2 standard requires more complex and thus expensive circuitry over cheaper wiring. The 100BaseT4 standard is generally thought of as being somewhere in the middle. The physical level interface for each standard is thus different, and therefore a physical device (PHY) that supports one of the standards is not inter-operable with a device that supports another standard.

At the start of a channel link, a common protocol, termed "auto-negotiation," is initiated in order to identify the nature of the standard that is supported by the device at the other end of the transmission channel. By way of example, auto-negotiation may be performed between a network "hub" and the network interface card (NIC) of a terminal, which is attempting to communicate with the hub, to ascertain the standard with which the network interface circuitry communicates. If the devices at opposite ends of the channel are not compatible, a link is either not possible, or more practically, the link may be "negotiated" down to a 10BaseT interface, which is a 10 Mbps link.

FIGS. 1 and 2 are prior art illustrations showing respectively the transmission architecture associated with the 100BaseT2 standard and a typical transceiver architecture therefor. Referring to FIG. 1, the 100BaseT2 standard typically employs only two pairs of copper wires, 102 and 104. Over each pair, data transmission takes place at full-duplex, with a bit rate of about 50 Mbps, a baud rate of about 25 Mega bauds per second (MBps). The analog-to-digital (A/D) sampling rate (e.g., on A/D 106 or 108) is about 75 Mega samples per second (Msamples/sec), as is the digital-to-analog (DAC) sampling rate (e.g., on DAC 110 or 112). The sampling rate, as is known, may represent any integer multiple of the baud rate.

FIG. 2 shows the 100BaseT2 transceiver architecture from one end of the channel link. The 100BaseT2 standard employs digital processing techniques, implemented by DSP block 114 in FIG. 2, to compensate for, among others, cable distortion and to perform cross-talk suppression. For each of the full-duplex twisted pair links, the physical device (PHY) dedicates one Digital to Analog Converter (DAC), one transmit filter (Tx filter), one Analog to Digital Converter (A/D), and one receive filter (Rx filter). The transmit and receive filter pairs (Tx/Rx filter pairs) for channels 102 and 104 are shown in FIG. 2 as Tx 116/Rx 118 pair and Tx 120/Rx 122 pair, respectively. As mentioned earlier, the A/Ds and DCs typically sample at 75 MHz, and the signals in the analog filters contain components up to around 25 MHz. In the DSP block the device may also contain two Echo/Near End Cross-Talk Cancellers and Two Equalizers (conventional and not shown in FIG. 2). This digital circuitry also operates typically at 75 MHz. Transformers 124 and 126 are employed to conform the data to the requirements of the standard, which is a conventional technique. Note that a 100BaseT2 transceiver has two of each analog circuit elements required to perform receive and transmit.

FIGS. 3 and 4 are prior art illustrations showing respectively the transmission architecture of the 100BaseTX standard and a typical transceiver architecture therefor. Referring to FIG. 3, the 100BaseTX standard also employs only two pairs of copper wires, 132 and 134. Over each pair, data transmission takes place at only half-duplex, with one pair carry data from master to slave and the other from slave to master. The bit rate is about 100 Mbps, and the baud rate is typically about 125 Mega bauds per second (MBps), which includes coding required for DC control and other signaling functions. The A/D sampling rate (e.g., on A/D 136) is typically at the baud rate, i.e., about 125 Msamples/sec, as is the DAC sampling rate (e.g., on DAC 140).

FIG. 4 shows the 100BaseTX transceiver architecture from one end of the channel link. The 100BaseTX standard also employs digital processing techniques, illustrated in FIG. 4 as DSP block 144, to also compensate for, among others, cable distortion. Since the environment in which the 100BaseTX standard is employed is typically less harsh than that associated with the 100BaseT2 environment, e.g., there is typically lower cross talk and little, if any, echo, the set of DSP functions in DSP block 144 is typically less complex than those implemented in DSP block 114 of the 100BaseT2 architecture. However, the higher sampling rate (i.e., 125 Msamples/sec versus 75 Msamples/sec) requires higher performance A/Ds and DACs in the conventional 100BaseTX implementation.

FIGS. 5 and 6 are prior art illustrations showing respectively the transmission architecture of the 100BaseT4 standard and a typical transceiver architecture therefor. Referring to FIG. 5, the 100BaseT4 standard employs four pairs of copper wires, 160, 162, 164, and 166. On pairs 164 and 166, the transmission is full duplex, and is half duplex on pairs 160 and 162. The bit rate is about 33.33 Mbps, and the baud rate is typically about 25 Mega bauds per second (MBps). The A/D sampling rate (e.g., on A/D 170, 172, or 174) is typically at 50 Mega samples/sec, as is the DAC sampling rate (e.g., on DAC 176, 178, or 180).

FIG. 6 shows the 100BaseT4 transceiver architecture from one end of the channel link. The 100BaseT4 standard also employs digital processing techniques, implemented in FIG. 6 by DSP block 182, to also compensate for, among others, cable distortion and to perform cross-talk suppression. The 100BaseT4 standard employs more pairs of wires at a lower baud rate than the 100BaseT2 standard, and the impairments are less severe than those seen in the 100BaseT2 implementation. Consequently, the set of DSP functions in DSP block 182 is typically less complex than those implemented in DSP block 114 of the 100BaseT2 architecture.

In the prior art, a transceiver is typically custom designed to transmit and receive in only one of the three standards. In other words, a given transceiver, such as that illustrated in one of FIGS. 2, 4, and 6, is not inter-operable with devices, hubs, or network interface cards (NIC) that adhere to a different standard or multiple standards. Consequently, it is typically necessary to design, manufacture, stock, and support different transceivers for different standards. Additionally, when transceivers are implemented as integrated circuits, the prior art custom approach involves a substantial chip die size overhead. By way of example, to implement 100BaseT2 and 100BaseTX, the prior art custom approach would require 50% more die size, and in order to implement 100BaseT4 with 100BaseT2 and/or 100Base TX, the prior art would require 80% to 100% more die size. As can be appreciated, this approach involves a substantial amount of design and manufacturing effort and expense.

In view of the foregoing, there is desired a common denominator transceiver architecture and methods therefor that support all three 100 Mbps standards: 100BaseT2, 100BaseTX, and 100BaseT4. To reduce manufacturing and implementation costs, the common denominator transceiver architecture and methods therefor preferably allow, with minor modifications, circuits of the common denominator transceiver architecture to be reused when implemented to support different standards.

SUMMARY OF THE INVENTION

In accordance with one aspect of the present invention, there is provided a common denominator transceiver architecture compatible with all three standards: 100BaseT2, 10 BaseTX, and 100BaseT4. By appropriately reclocking the analog-to-digital converters (A/Ds) and the digital-to-analog converters (DACs), as well as multiplexing their inputs and outputs via a combination of configurable digital switches and configurable analog switches, the common denominator transceiver architecture of the present invention is advantageously capable of supporting all three aforementioned standards.

In one embodiment, the 100BaseT2 configuration is employed as the base configuration of the common denominator transceiver architecture. To enable the common denominator transceiver design to support other standards, circuit blocks (such as analog filter blocks, analog-to-digital converters, digital-and-analog converters, analog switches, digital switches, and digital processing circuitry) are advantageously reused, thereby minimizing implementation cost.

The present invention relates, in one embodiment, to a transceiver for exchanging data with a transmission channel using one of a 100BaseT2, 100BaseTX, and 100BaseT4 standards, which includes a receive circuit for receiving analog data from the transmission channel. The receive circuit includes a first switch and a first analog-to-digital converter coupled to the first switch. The receive circuit further includes a second analog-to-digital converter coupled to the first switch. There is further included a second switch coupled to the first analog-to-digital converter and to the second analog-to-digital converter. The analog data is switched by the first switch into the first analog-to-digital converter and the second analog-to-digital converter to allow the first analog-to-digital converter and the second analog-to-digital converter to support sampling requirements of the one of the 100BaseT2,the 100BaseTX, and the 100BaseT4 standards.

In another embodiment, the invention relates to a transceiver for exchanging data with a transmission channel using one of a 100BaseT2, 100BaseTX, and 100BaseT4 standards, including a transmit circuit for converting digital data to analog data for transmission on the transmission channel using the one of the standards. The transmit circuit includes a first switch, a first digital-to-analog converter coupled to the first switch, and a second first digital-to-analog converter coupled to the first switch. The transmit circuit further includes a second switch coupled to the first digital-to-analog converter and to the second first digital-to-analog converter. The digital data is switched by the first switch into the first digital-to-analog converter and the second digital-to-analog converter to allow the first digital-to-analog converter and the second digital-to-analog converter to support sampling requirements of the one of the 100BaseT2,the 100BaseTX, and the 100BaseT4 standards.

In yet another embodiment, the invention relates to a method for exchanging data with a transmission channel using one of a 100BaseT2, 100BaseTX and 100BaseT4 standards. The method includes receiving analog data from the transmission channel, and switching the received analog data through a configurable analog switch. The method farther includes converting first analog data from the configurable analog switch to first digital data using a first reclock-enabled analog-to-digital converter, and converting second analog data from the configurable analog switch to second digital data using a second reclock-enabled analog-to-digital converter. The method also includes coupling the first digital data and the second digital data to a digital signal processing circuit using a configurable digital switch coupled to the first analog-to-digital converter and the second analog-to-digital converter. The method also includes performing signal processing on at least one of the first digital data and the second digital data received via the configurable digital switch.

These and other advantages of the present invention will become apparent upon reading the following detailed descriptions and studying the various figures of the drawings.

BRIEF DESCRIPTION OF THE DRAWINGS

FIGS. 9C and 9D illustrate implementations of a DSP circuit that work well in receiving 100BaseTX data from the inventive transceiver.

DETAILED DESCRIPTION OF THE PREFERRED EMBODIMENTS

Figure 1:
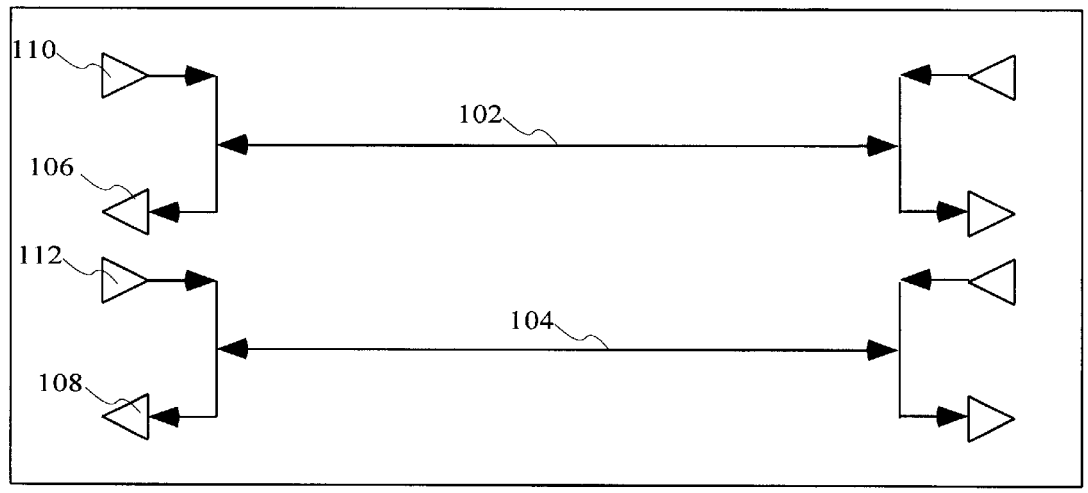
FIGS. 1 and 2 are prior art illustrations showing, respectively, the transmission architecture associated with the 100BaseT2 standard and a typical transceiver architecture therefor.
Figure 2:
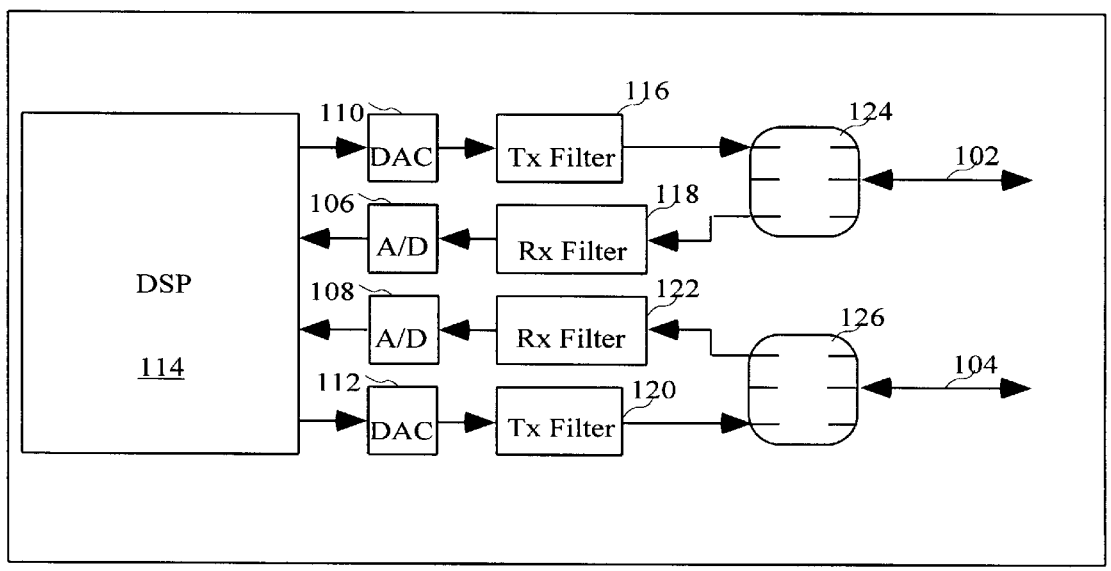
Figure 3:
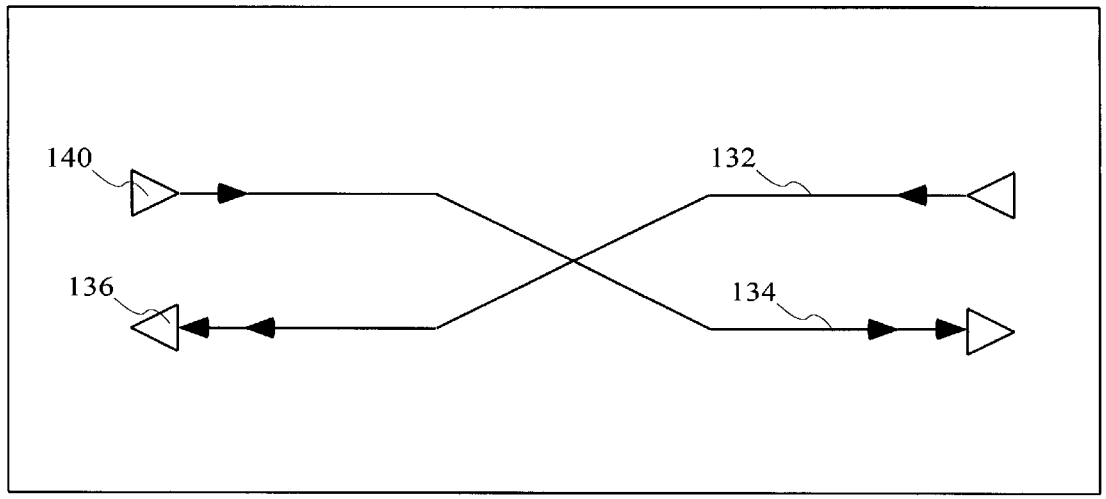
FIGS. 3 and 4 are prior art illustrations showing, respectively, the transmission architecture of the 100BaseTX standard and a typical transceiver architecture therefor.
Figure 4:
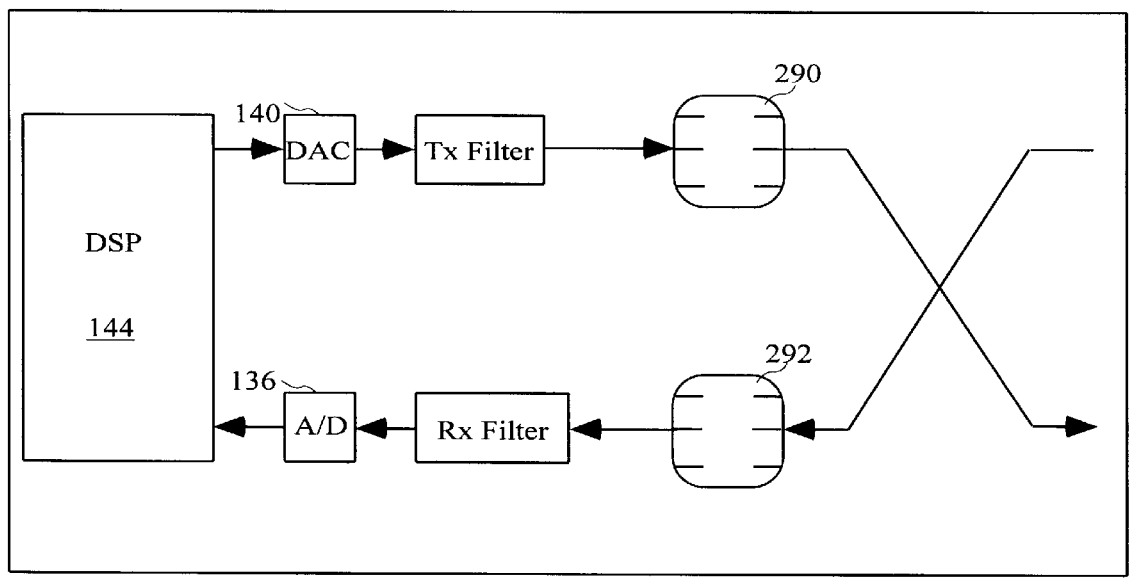
Figure 5:
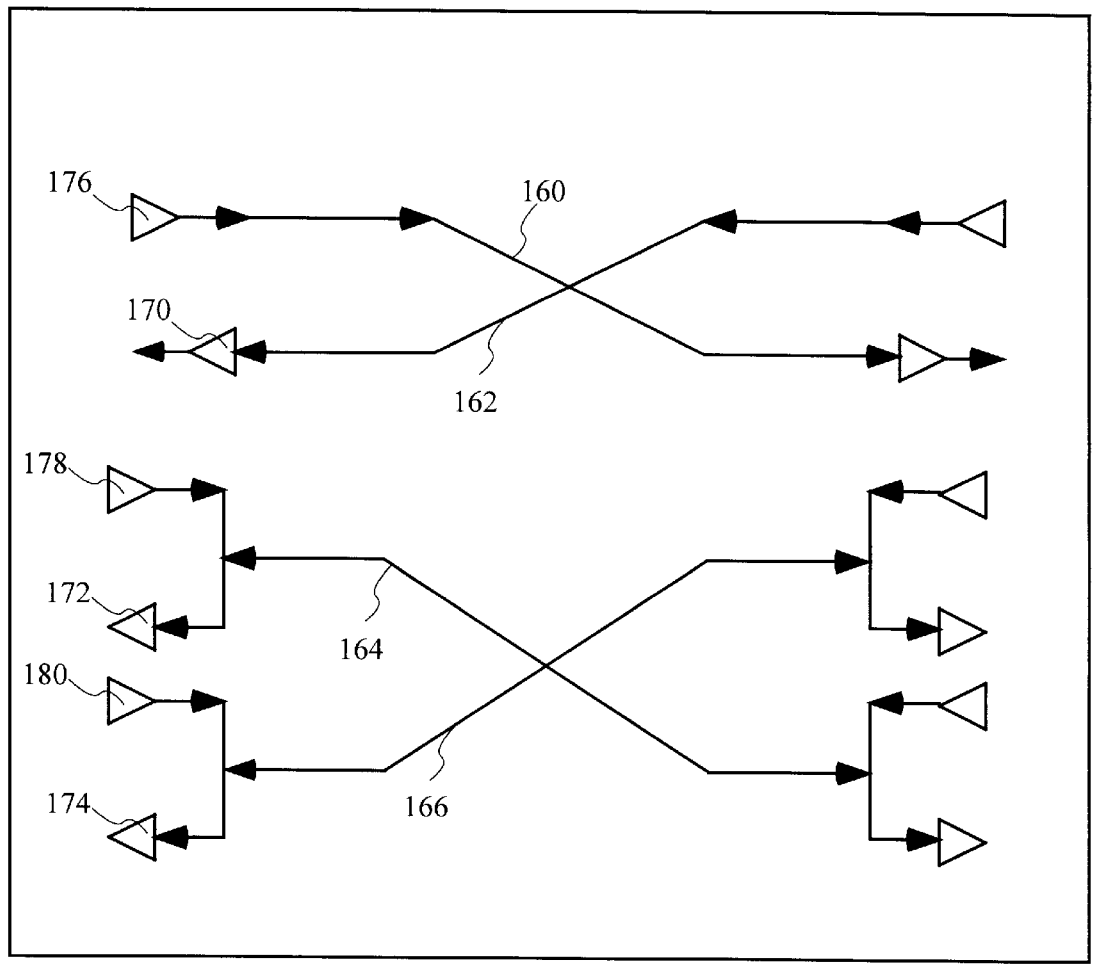
FIGS. 5 and 6 are prior art illustrations showing, respectively, the transmission architecture of the 100BaseT4 standard and a typical transceiver architecture therefor.
Figure 6:
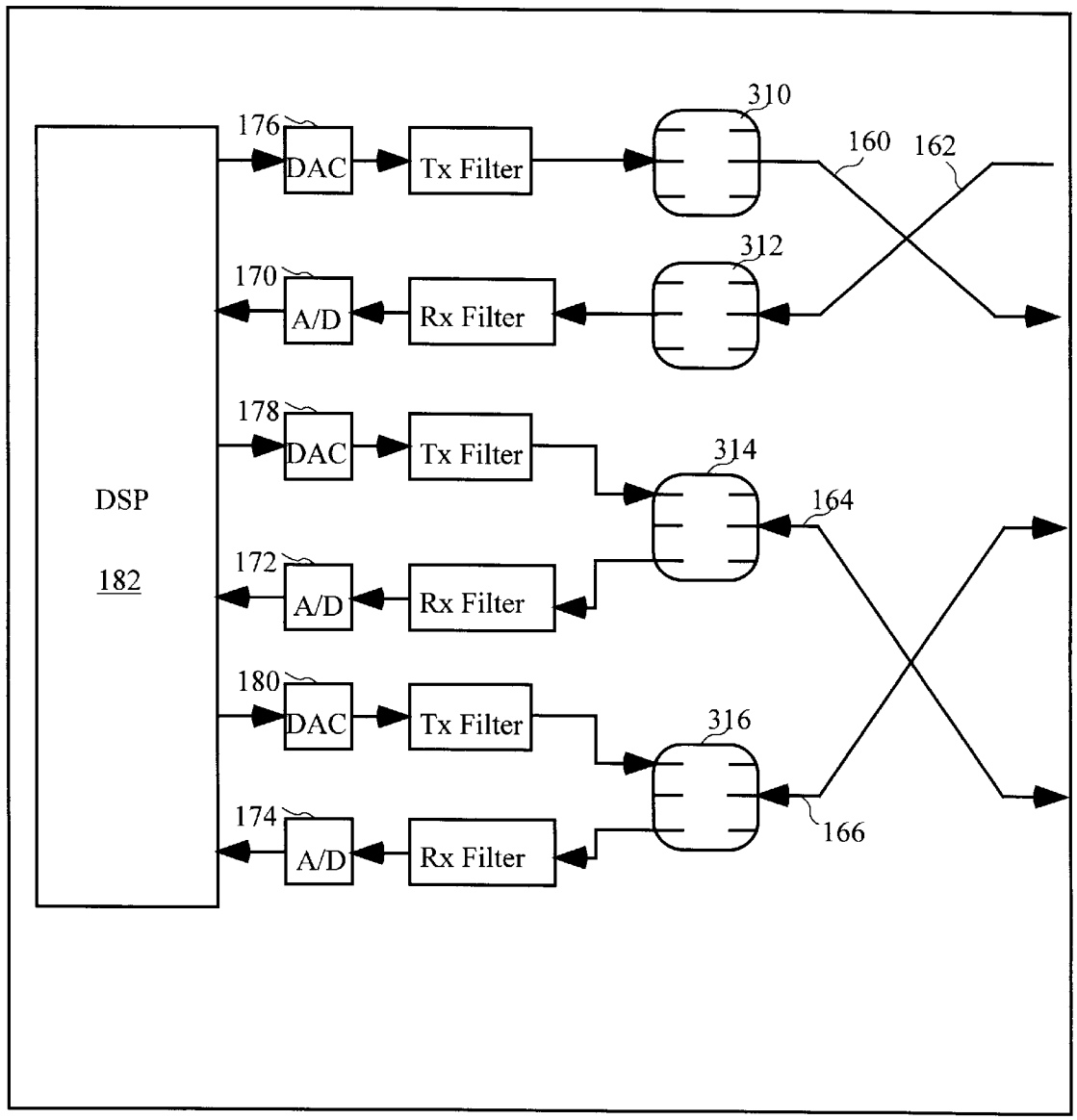

FIGS. 1 and 2 are prior art illustrations showing, respectively, the transmission architecture associated with the 100BaseT2 standard and a typical transceiver architecture therefor. FIGS. 3 and 4 are prior art illustrations showing, respectively, the transmission architecture of the 100BaseTX standard and a typical transceiver architecture therefor. FIGS. 5 and 6 are prior art illustrations showing, respectively, the transmission architecture of the 100BaseT4 standard and a typical transceiver architecture therefor.

Common denominator transceiver architectures and methods therefor that support all three 100 Mbps standards: 100BaseT2, 100BaseTX, and 100BaseT4 are described herein. In the following description, numerous specific details are set forth in order to provide a thorough understanding of the present invention. It will be obvious, however, to those skilled in the art, that the present invention may be practiced without some or all of the specific details. In other instances, well-known structures, techniques, or process steps have not been described in detail in order not to unnecessarily obscure the present invention.

In accordance with one aspect of the present invention, the common denominator transceiver architecture employs the 100BaseT2 architecture as its base design. As discussed in connection with FIGS. 1 and 2, the 100BaseT2 architecture requires two A/Ds and two DACs, each sampling at about 75 Mega samples for second. It is recognized that the total sampling rate for the two A/Ds of the 100BaseT2 architecture is about 150 Mega samples per second. It is also recognized that the sampling rate for the 100BaseTX architecture is about 125 Mega samples per second for the single A/D therein, which is less than the total sampling rate performed by the two A/Ds of the 100BaseT2 design. It is further recognized that the total sampling rate for the 100BaseT4 architecture is 3 times 50 Mega samples per second or 150 Mega samples per second total for the three A/Ds therein, which is equal to the total sampling rate performed by the two A/Ds of the 100BaseT2 architecture. Accordingly, it is realized that there are sufficient A/D resources in the 100BaseT2 architecture to accommodate the A/D requirements of the 100BaseTX and 100BaseT4 architectures if the A/D (and DAC) of the 100BaseT2 architecture can be multiplexed and reclocked to advantageously satisfy the requirements of the other two standards, i.e., the 100BaseTX and the 100BaseT2 standards.

With respect to digital processing resources (DSP), it is recognized that the 100BaseT2 standard is typically implemented in the most severe environment compared to the environmental conditions associated with the 100BaseTX or 100BaseT4 implementations. As discussed in connection with FIGS. 1–6, the DSP resources associated with the 100BaseT2 implementation are the most comprehensive, and it is realized that only a subset of the 100BaseT2 DSP processing power is required to satisfy the DSP processing needs of the 100BaseTX or 100BaseT4 standards. Consequently, if the DSP resources, the A/Ds, and the DACs of the 100BaseT2 design can be reconfigured to support the 100BaseTX and 100BaseT4 designs, a single common denominator can advantageously be realized and efficient use of the resources therein can advantageously be achieved to support all three standards.

Figure 7A:
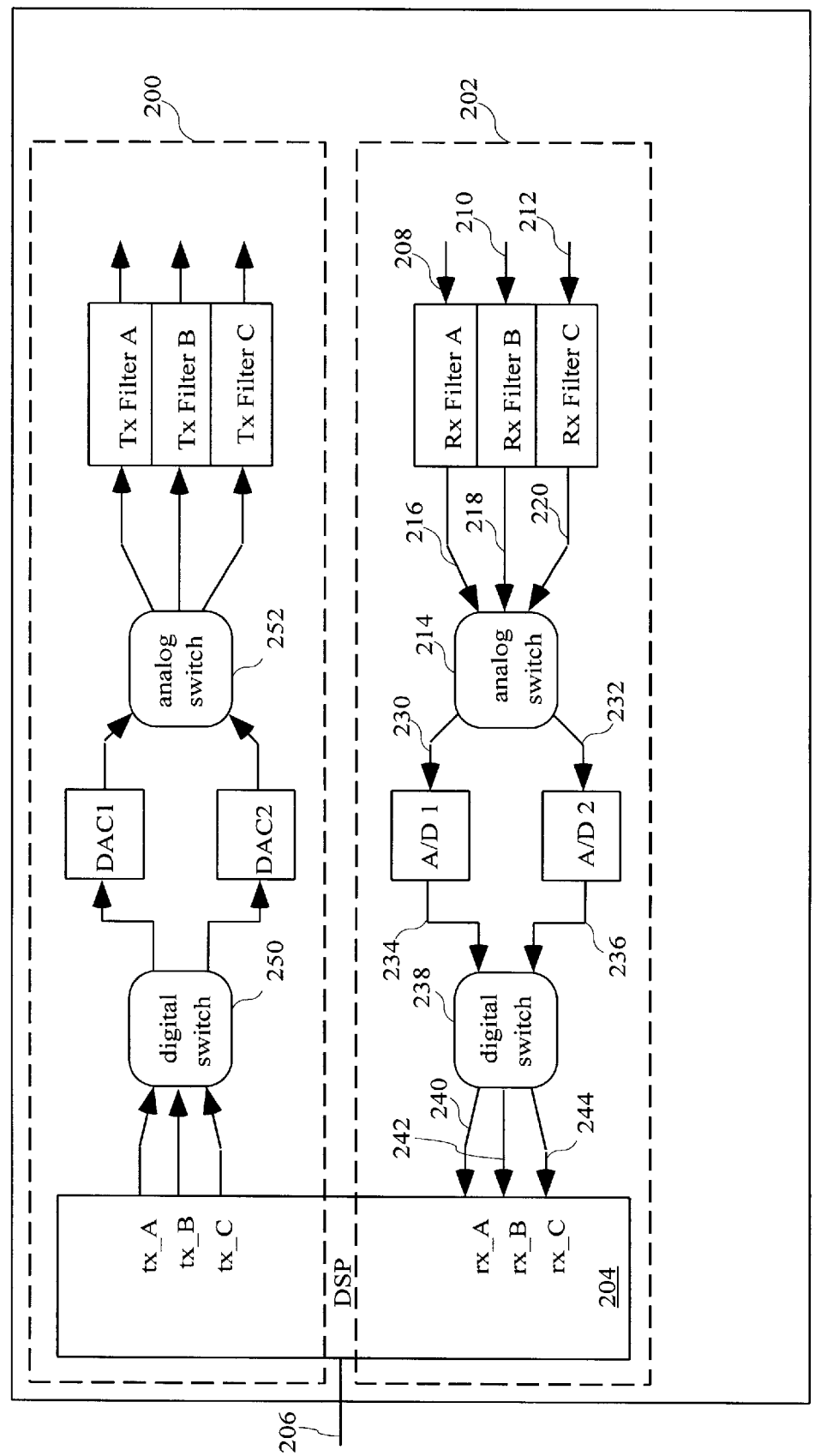
FIG. 7A is a general, high-level schematic drawing illustrating the common denominator transceiver design in accordance with one aspect of the present invention.

To facilitate discussion, FIG. 7A is a general, high-level schematic drawing illustrating the common denominator transceiver design in accordance with one aspect of the present invention. As mentioned earlier, the common denominator transceiver design is configured to support the 100BaseT2 standard in its base configuration. When reconfigured, the DSP, A/D and DAC resources of the common denominator transceiver can be employed to support the 100BaseTX or 100BaseT4 standards.

For ease of illustration, FIG. 7A illustrates the architecture from only one end of the transmission channel. There are shown in FIG. 7A a transmit circuit 200 and a receive circuit 202. Transmit circuit 200 represents the circuitry that may be reconfigured to transmit data received from DSP 204 out to the transmission channel in any of the three standards. Likewise, receive circuit 202 represents the circuit that may be reconfigured to receive data in any of the three standards from the transmission channel, and to forward the received data to DSP 204.

DSP 204 represents the logical block that performs digital processing on data received on channel 206 for transmission on the transmission channel via transmit circuit 200, or on data received from the transmission channel via receive circuit 202. As the term is used hereinafter, transmission channel refers to the physical data transmission medium (e.g., fiber optic, wireless, twisted pairs of copper wires, or the like) over which data is transmitted via transmit circuit 200 or received via receive circuit 202 of the transceiver. As can be appreciated by those of skill, the exact specification of the transmission channel (e.g., quality of the wiring) depends in part on the standard employed, and vice versa.

Within receive circuit 202, there are shown three receive filters, Rx_Filter A, Rx_Filter B, and Rx_Filter C, for receiving data on respective analog channels 208, 210, and 212 of the transmission channel. Receive filters A, B, and C are analog filters of a conventional design, and are substantially similar to one another in one embodiment. After being filtered, the received data is then input into a configurable analog switch 214 via channels 216, 218, and 220.

Depending on the receive standard (100BaseT2, 100BaseTX, or 100BaseT4), configurable analog switch 214 switches data from one or more of channels 216, 218, and 220 onto analog switch outputs 230 and 232. Implementations of configurable analog switch 214 are explored in greater detail in connection with subsequent FIGS. 7B and 7C.

The analog data on analog switch outputs 230 and 232 is converted to a digital format by reclock-enabled analog-to-digital converters A/D1 and A/D2, respectively. Reclock-enabled analog-to-digital converters A/D1 and A/D2 represent analog-to-digital converters whose sampling rates may be reclocked, i.e., varied, responsive to a control signal A/D1 output 234 and A/D2 output 236 serve as input into a configurable digital switch 238. Depending on which standard is employed, configurable digital switch 238 switches digital data from one or both of A/D1 output 234 and A/D2 output 236 onto one or more of digital channels 240, 242, and 244. Implementations of configurable digital switch 238 will be explored in greater detail in connection with the aforementioned FIGS. 7B and 7C.

When receive circuit 202 is configured to operate with the 100BaseT2 standard, the transmission channel typically consists of only two pairs of copper wires, i.e., two analog channels, as discussed earlier in connection with FIGS. 1 and 2. For ease of discussion, assume that the analog channels employed are analog channels 208 and 210, although any two of the three available analog channels of receive circuit 202 may be employed. Data received via Rx_Filter A is switched by configurable analog switch 214 to analog-to-digital converter A/D1. The digital data on analog switch output 230 is subsequently switched by configurable digital switch 238 into receiving port Rx_A of DSP 204 (via channels 234 and 240 respectively). Likewise, analog data from Rx_Filter B is switched by configurable analog switch 214 onto analog-to-digital converter A/D2. The digital data on A/D2 output 236 is then switched by configurable digital switch 238 onto receiving port Rx_B of DSP 204 (via channels 236 and 242 respectively).

Figure 7B:
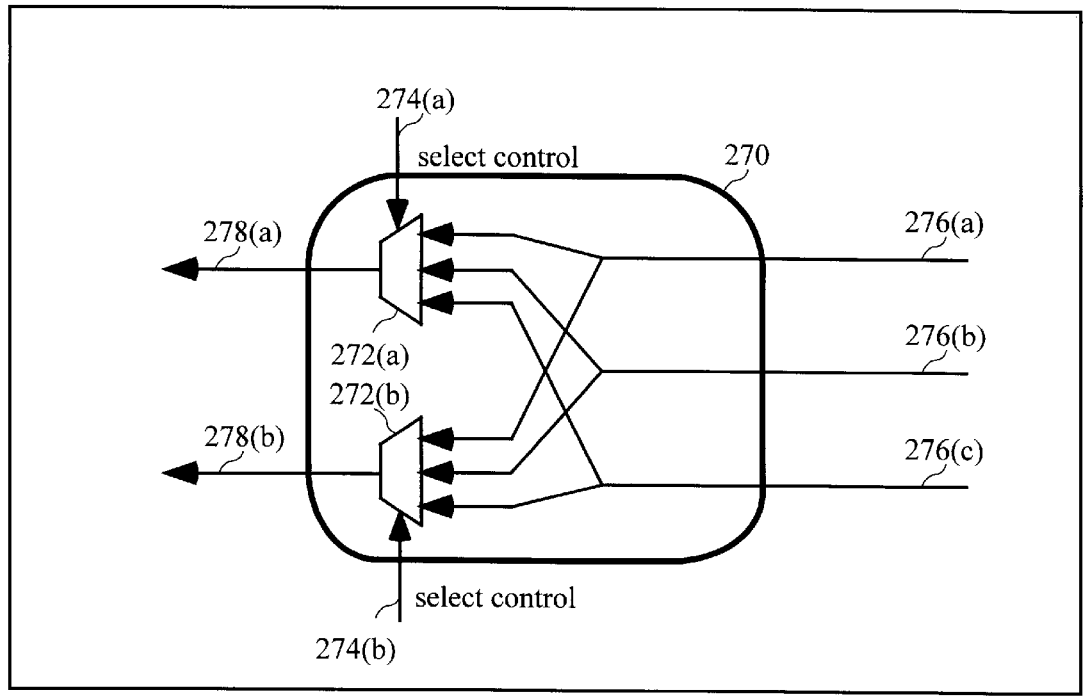
FIG. 7B illustrates one implementation of a 3:2 switch.

It should be apparent to those skilled in the art that transmit circuit 200 operates in an analogous manner, with digital data from transmit port TX_A of DSP 204 being switched by configurable digital switch 250 to reclock-enabled digital-to-analog converter DAC1, and by configurable analog switch 252 to transmit filter Tx_Filter A before being put onto the transmission channel for transmission. Likewise, digital data from transmit port TX_B is switched by configurable digital switch 250 to reclock-enabled digital-to-analog converter DAC2, and by configurable analog switch 252 to transmit filter Tx_Filter B (or Tx_Filter C if desired) before being put on the transmission channel for transmission. Reclock-enabled digital-to-analog converters DAC1 and DAC2 represent digital-to-analog converters whose sampling rates may be reclocked, or varied, responsive to a control signal FIG. 7B illustrates one implementation of a 3:2 switch 270 of the type that may be used to implement configurable analog switch 214 of FIG. 7A. It should be borne in mind that the implementation of FIG. 7B is shown for illustration purposes only; switch 270 may well be implemented via many alternative conventional techniques. Multiplexers 272 (a) and 272(b) select, responsive to control signals on select controls 274(a) and 274(b), which of inputs 276(a), 276(b), or 276(c) would be output on respective outputs 278(a) and 278(b). Preferably the components of switch 270 are chosen so as to preserve at the outputs the fidelity of the analog data input on inputs 276(a), 276(b), and 276(b). It will be apparent to those skilled that control signals on select controls 274(a) and 274(b) may be implemented by two bits to select from the three inputs. It will also be apparent to those skilled that the architecture of switch 270 may also be employed to implement digital switch 250 of FIG. 7A.

Figure 7C:
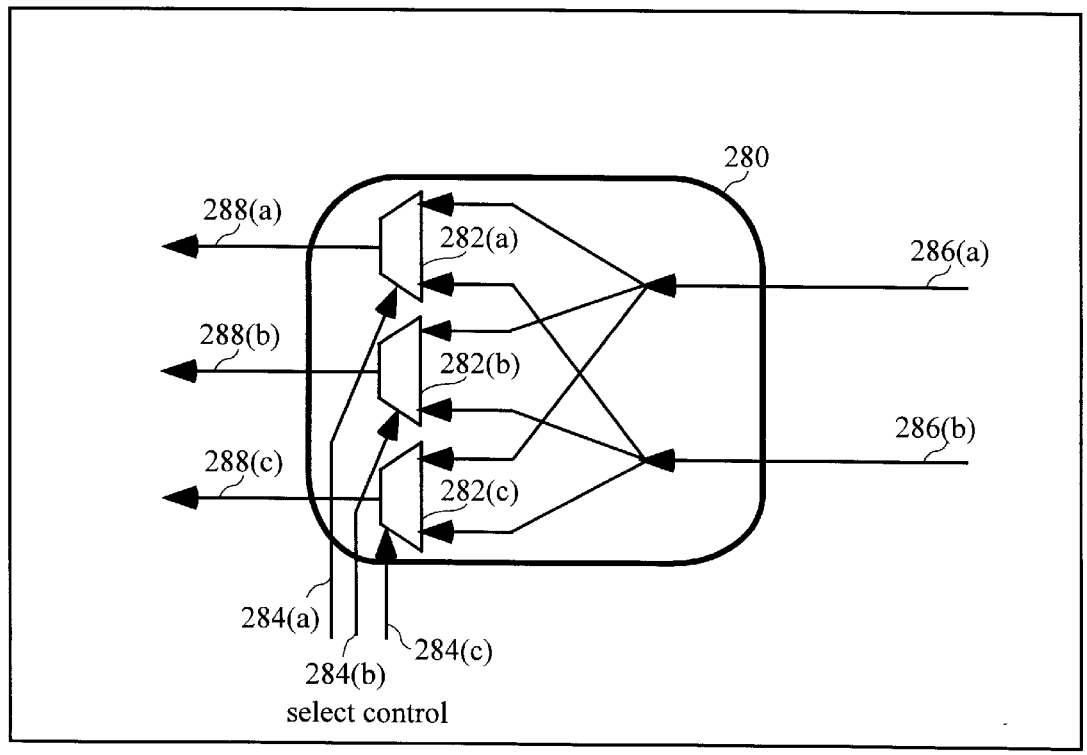
FIG. 7C illustrates one implementation of a 2:3 switch.

FIG. 7C illustrates one implementation of a 2:3 switch 280 of the type which may be used to implement configurable digital switch 238 of FIG. 7A. It should be borne in mind that the implementation of FIG. 7B is shown for illustration purposes only; switch 280 may well be implemented via many alternative conventional techniques. Multiplexers 282(a), 282(b), and 282(c) select, responsive to control signals on select controls 284(a), 284(b), and 284(c) which of inputs 286(a) and 286(b) would be output on respective outputs 288(a), 288(b), or 288(c). It will be apparent to those skilled that control signals on select controls 284(a), 284(b), and 284(c) may be implemented by one bit to select from the two inputs or by two bits to select from the two inputs and to turn off the multiplexers, for example. It will also be apparent to those skilled that switch 280 may also be employed to implement analog switch 252 of FIG. 7A. When implemented as an analog switch, the components of switch 280 are preferably chosen so as to preserve at the outputs the fidelity of the analog data input from DAC1 and DAC2.

In accordance with a particularly advantageous aspect of the present invention, the two reclock-enabled analog-to-digital converters, A/D1 and A/D2, in cooperation with configurable analog switch 214 and configurable digital switch 238 of the common denominator transceiver design may be configured to sample either data received on two analog channels of the transmission channel using the 100BaseT2 standard, data received on a single analog channel of said transmission channel using the 100BaseTX standard, or data received on all three analog channels of said transmission channel using the 100BaseT4 standard. On the transmit side, two reclock-enabled digital-to-analog converters, DAC1 and DAC2, configurable digital switch 250, and configurable analog switch 252 may be configured to output data either from two transmit ports of DSP 204 to two analog channels (as in the case of the 100BaseT2 standard), or data from a single transmit port of DSP 204 to a single analog channel (as in the case of the 100BaseTX standard), or data from all three transmit ports of DSP 204 to all three analog channels (as in the case of the 100BaseT4 standard).

The following figures and description illustrate examples of specific configurations that enable the inventive common denominator transceiver design to transmit and receive data in each of the three standards. In the discussions that follow, the invention is described in detail with reference to the receive circuit only for brevity. The application of the invention to the transmit circuit, which mirrors the receive circuit, should be apparent to those skilled in the art given this disclosure.

Figure 8A:
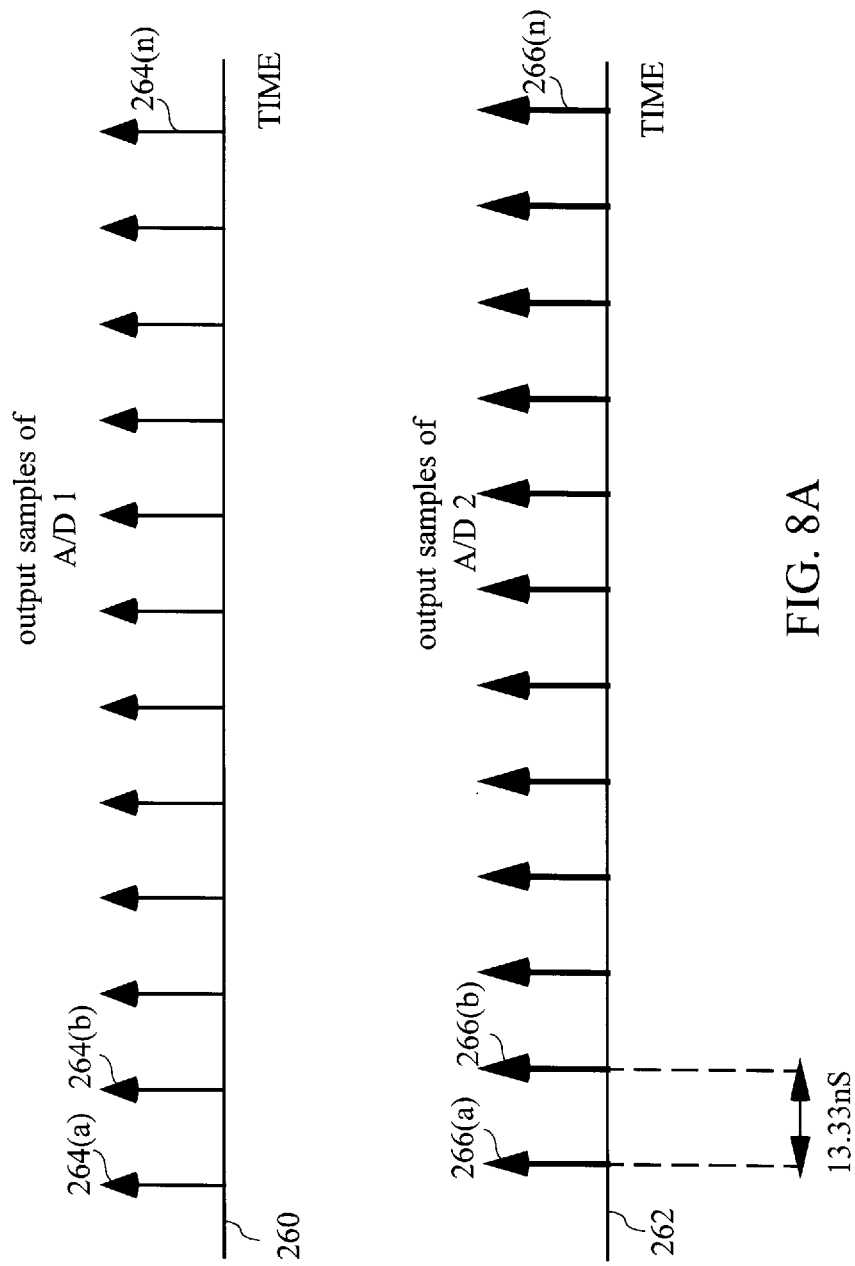
FIG. 8A is a timing diagram illustrating the outputs of the configurable analog-to-digital converters of the receive circuit when the common denominator transceiver is configured to receive data from the transmission channel using the 100BaseT2 standard.

FIG. 8A is a timing diagram illustrating the outputs of configurable analog-to-digital converters A/D1 and A/D2 when receive circuit 202 is configured to receive data from the transmission channel using the 100BaseT2 standard. With reference to FIG. 7A, the output of A/D1 is represented on timeline 260 and the output of A/D2 is represented on timeline 262. For ease of discussion, the two twisted pairs of the 100BaseT2 standard are assumed to be coupled to receive filters, Rx_Filter A and Rx_Filter B although, as mentioned earlier, any two of the three receive filters may be employed. For example, the three analog filters may be implemented as programmable filter blocks, any one of which may be selected to filter data from the transmission channel.

Configurable analog switch 214 is configured to couple channel 216 to analog switch output 230, and channel 218 to analog switch output 232. Reclock-enabled analog-to-digital converters A/D1 and A/D2 are clocked to sample their data on respective analog switch outputs 230 and 232 at 75 Megahertz or every 13.33 nanoseconds. Preferably, analog-to-digital converters A/D1 and A/D2 sample in sync. Output samples 264(a) . . . 264(n) represent the sampled version, i.e., digital version, of the analog data received via Rx_Filter A from the transmission channel Analogously, output samples 266(a) . . . 266(n) represent the sampled version of the analog data received via receive filter Rx_Filter B. Configurable digital switch 238 is configured to couple A/D1 output 234 to digital channel 240, and A/D2 output 236 to digital channel 242. Consequently, receive circuit 202 receives data from the two twisted pairs coupled to receive filters, Rx_Filter A and Rx_Filter B, digitize the received analog data from the two separate channels using two A/Ds, and finish the sampled version to DSP receive ports Rx_A and Rx_B, via digital switch 238 and digital channels 240 and 242, respectively.

The reclocking of A/D1 and A/D2, and reconfiguration of configurable analog switch 214 and configurable digital switch 214 may be implemented via a control circuit coupled to all these four components. The control signals generated to support each standard may be implemented via conventional digital design techniques to reclock the A/Ds in accordance to the disclosed timing diagram and to multiplex the switches in accordance with this disclosure.

Once the digital data is received at the DSP receive ports, e.g., at DSP receive port Rx_A via digital channel 240, it may be filtered and sliced to remove noise and restore distortion from the line via conventional filter/equalizer and slicer/decision circuits. FIG. 8C illustrates one implementation of DSP block 204 wherein digital data from channel A, which is sampled by analog-to-digital converter A/D1, is received by a filter/equalizer circuit 300 and sliced by a conventional slicer/decision circuit 302 of the DSP before being input into a decoding circuit at 25 Megabits per second.

Transmit circuit 200 works in an analogous manner when transmitting using the 100BaseT2 standard. Data from DSP transmit port TX_A is coupled by configurable digital switch 250 to digital-to-analog converter DAC1 and by configurable analog switch 252 to Tx_Filter A to be placed on the twisted pair coupled therewith. Likewise, digital data on TX_B is coupled via configurable digital switch 250 to digital-to-analog converter DAC2, and by configurable analog switch 252 to Tx_Filter B. As can be appreciated by those of skill, the control signals to the DACs and switches of the transmit circuit may be generated in the same manner as those generated for the receive circuit.

Figure 8B:
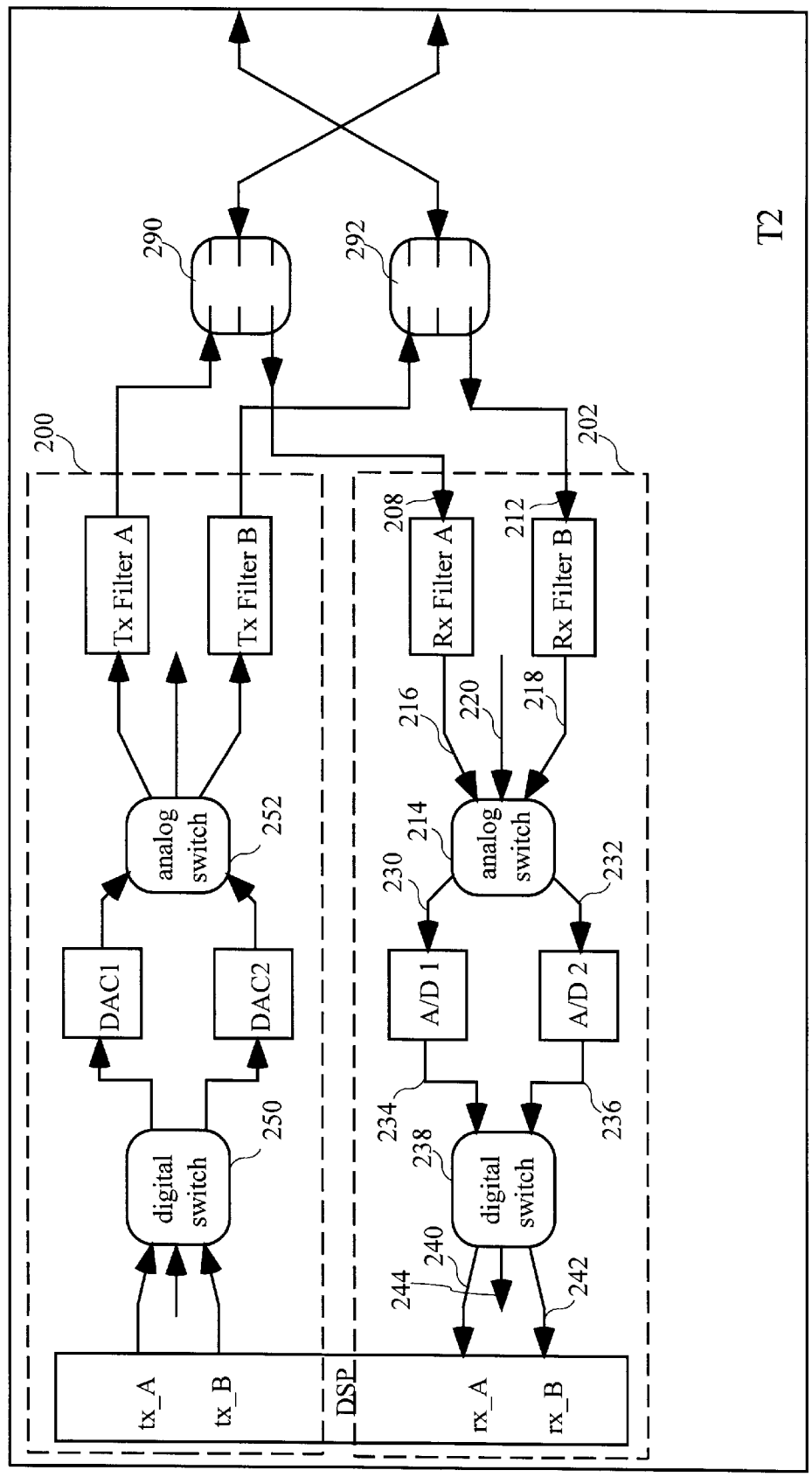
FIG. 8B illustrates, in accordance with one embodiment of the present invention, an implementation of the common denominator transceiver architecture of FIG. 7A to transmit and receive in the 100BaseT2 standard.
Figure 8C:
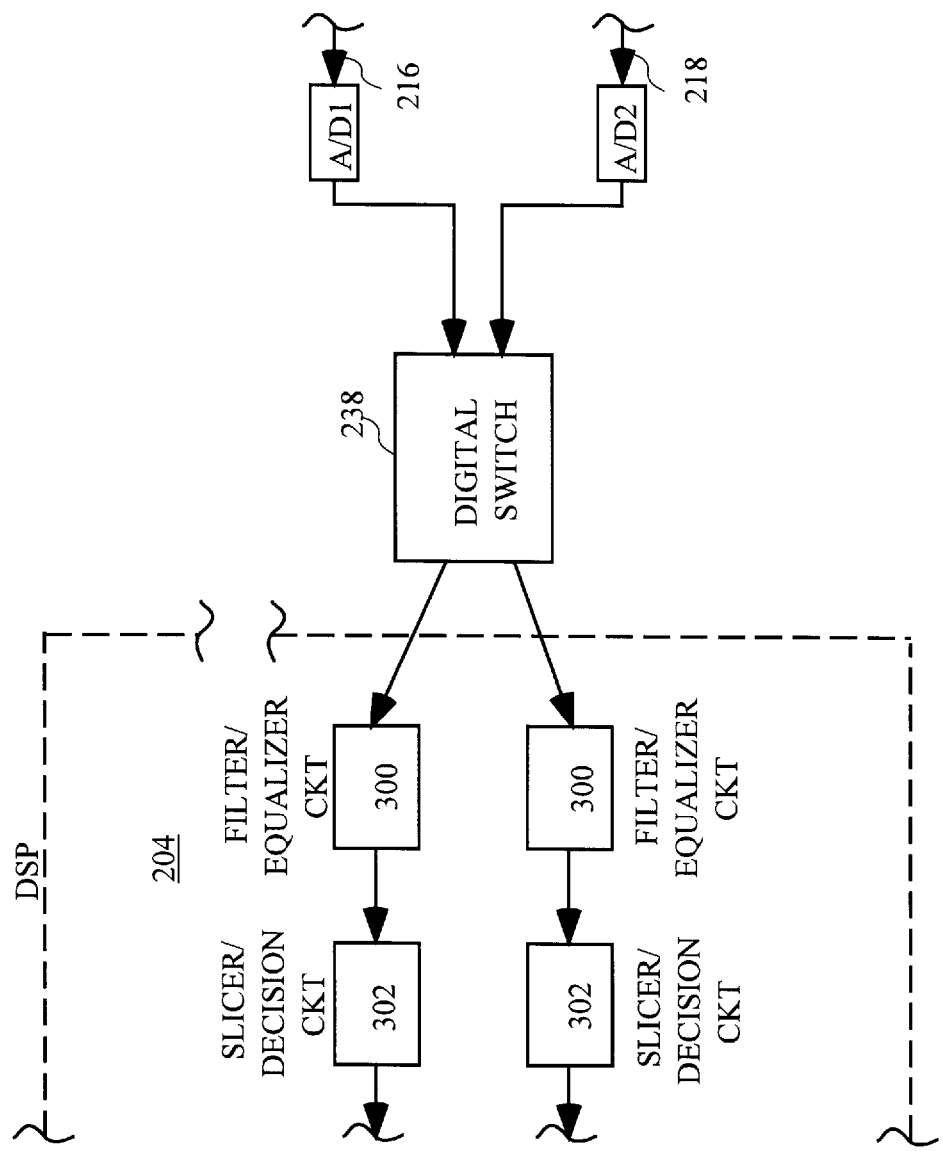
FIG. 8C illustrates, in accordance with one embodiment of the present invention, an implementation of a DSP circuit that works well in receiving 100BaseT2 data from the inventive transceiver.

For greater clarity, the implementation of the common denominator transceiver architecture of FIG. 7A to transmit and receive in the 100BaseT2 standard is illustrated in FIG. 8B. Transformers 290 and 292, which are employed as conventional to conform the data to the requirements of the 100BaseT2 standard, are also shown to provide context for the inventive configuration of FIG. 8B.

Figure 9A:
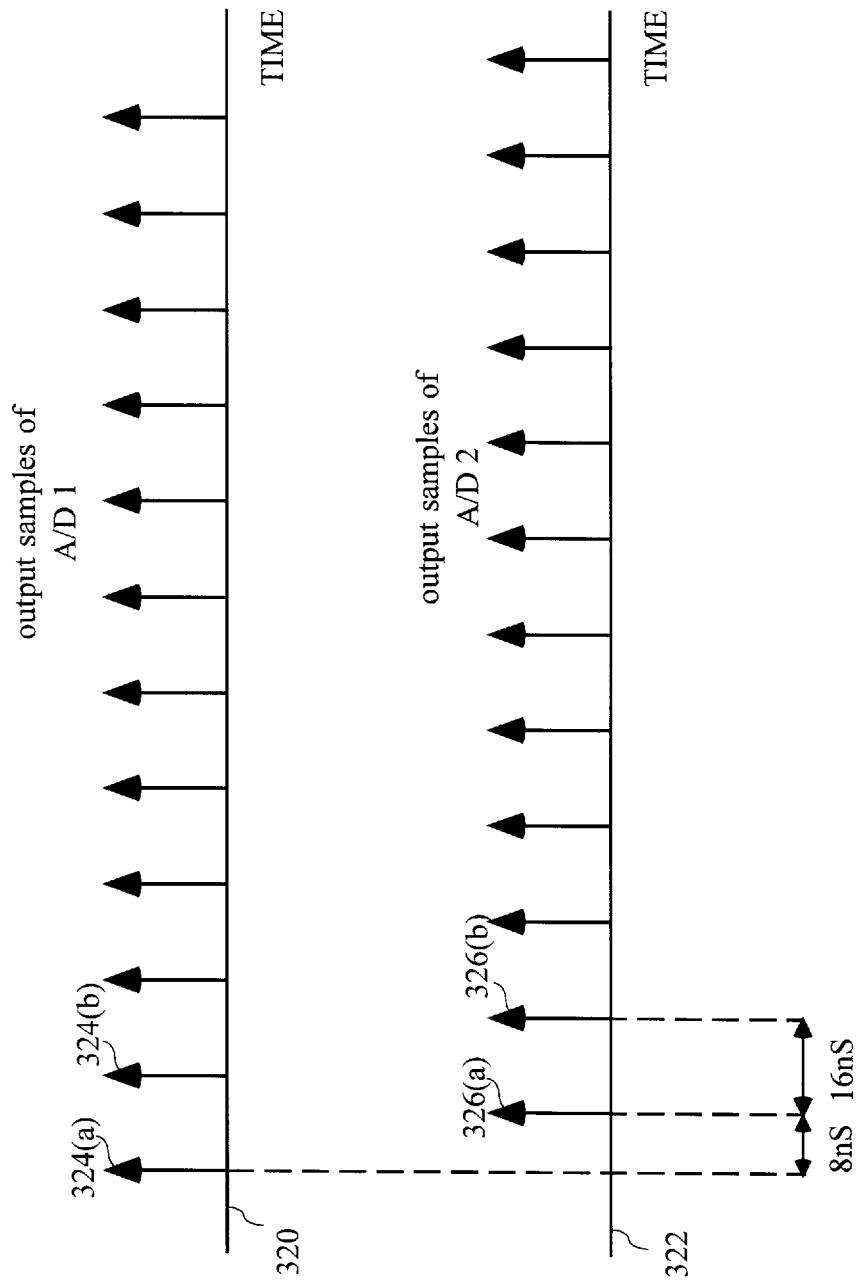
FIG. 9A is a timing diagram illustrating, in accordance with one aspect of the present invention, the outputs of the configurable analog-to-digital converters of the receive circuit when the common denominator transceiver is configured to receive data from the transmission channel using the 100BaseTX standard.

FIG. 9A is a timing diagram illustrating the output samples of digital-to-analog converters A/D1 and A/D2 when receive circuit 202 is configured to operate in the 100BaseTX standard. Timeline 320 represents the output samples of analog-to-digital converter A/D1 while timeline 322 shows the output samples of analog-to-digital converter A/D2. As shown in FIG. 9A, analog-to-digital converter A/D1 samples its input and provides an output every 16 nanoseconds. In other words, analog-to-digital converter A/D1 operates at 62.5 Megahertz.

Analog-to-digital converter A/D2 also samples its input and provides an output every 16 nanoseconds (for a sampling rate of 62.5 Megahertz). However, each output sample of analog-to-digital converter A/D2 is offset from an output sample of analog-to-digital converter A/D1 by 8 nanoseconds. Consequently, when the output samples from A/D1 and A/D2 are combined, the combined output samples are 8 nanoseconds apart for an effective sampling rate of 125 Mega samples per second, which is advantageously the required sampling rate for the 100BaseTX standard.

Figure 9B:
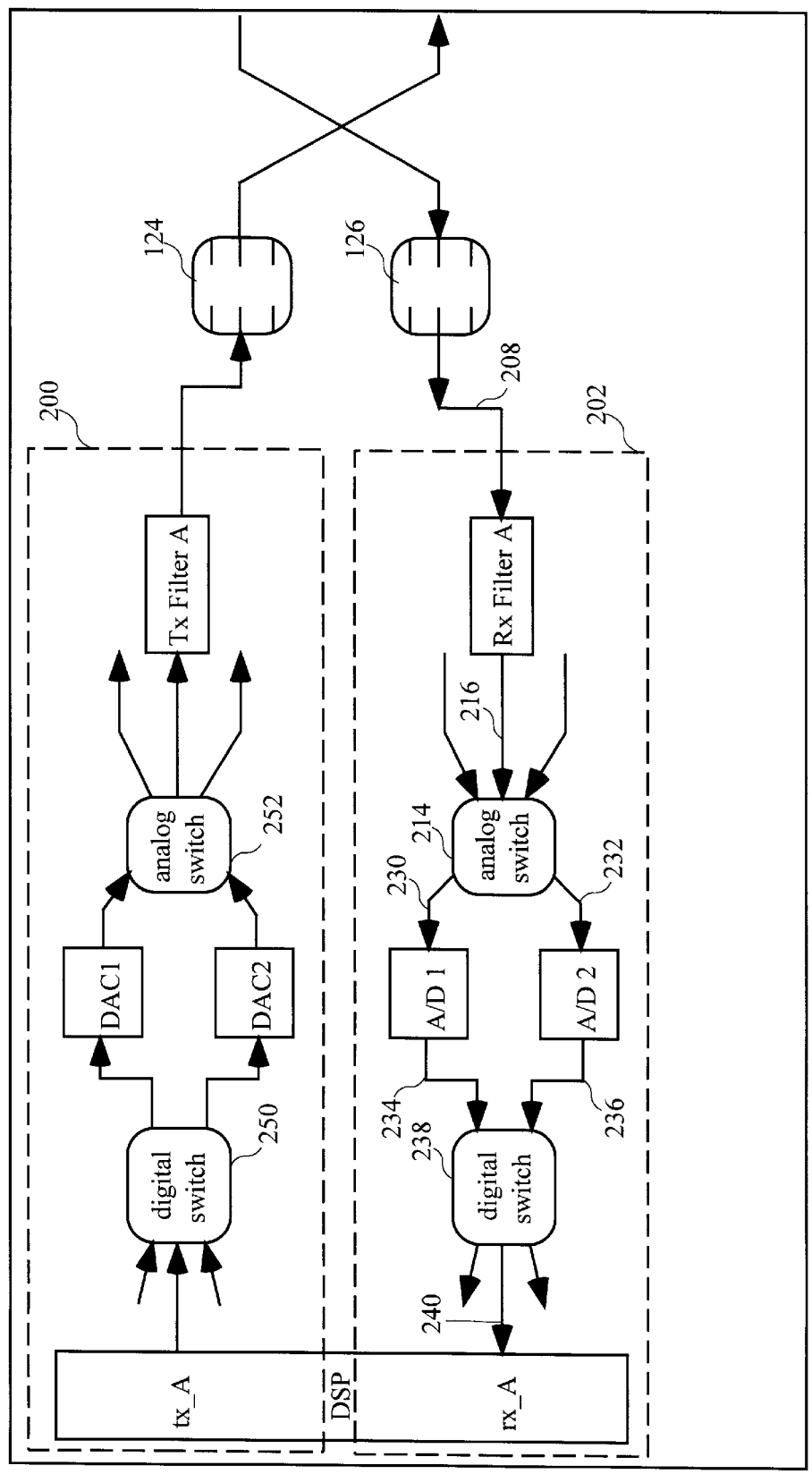
FIG. 9B illustrates, in accordance with one embodiment of the present invention, the common denominator transceiver design of FIG. 7A when configured to transmit and receive data using the 100BaseTX standard.

FIG. 9B illustrates the common denominator transceiver design of FIG. 7A when configured to transmit and receive data using the 100BaseTX standard. Transformer 124 and 126 of FIG. 2, which are employed as conventional to conform the data to the requirements of the 100BaseT2 standard, are also shown to provide context for the inventive configuration of FIG. 9B. As discussed in connection with FIG. 3, the transmission channel of the 100BaseTX standard typically includes only one twisted pair of wires 132. Consequently, only one of the receive filters, Rx_Filter A, Rx_Filter B, or Rx_Filter C, needs to be employed.

For ease of discussion, assume that receive filter Rx_Filter A is employed to receive data from the transmission channel. In an alternating manner, configurable analog switch 214 switches the analog data received from receive filter RX_Filter A onto reclock-enabled analog-to-digital converter A/D1 and reclock-enabled analog-to-digital converter A/D2, thereby allowing each analog-to-digital converter to receive alternating subsets of the analog data received from receive filter Rx_Filter A. Accordingly, each of analog-to-digital converters A/D1 and A/D2 needs to sample at only half of the sampling rate required by the 100BaseTX standard, i.e., at only one-half of the 125 Mega samples per second rate, or 62.5 Mega samples per second.

With reference to FIG. 9B, analog-to-digital converter A/D1 outputs its sample 324(a), to be followed by output sample 326(a) of analog-to-digital converter A/D2, 8 nanoseconds later, to be followed again by output sample 324(b) from analog-to-digital converter A/D1, 8 nanoseconds later, and so on. When combined by configurable digital switch 238, these two analog-to-digital converters A/D1 and A/D2 effectively sample in combination input data from the transmission channel every 8 nanoseconds for an effective sampling rate of 125 Mega samples per second. The control signals for the A/Ds and switches of FIG. 9B may be generated using any conventional digital technique to generate the output of FIG. 9A and the results described in connection with FIGS. 9A and 9B.

Since reclock-enabled analog-to-digital converters A/D1 and A/D2 are designed to operate with the 100BaseT2 standard of the common denominator transceiver design, i.e., at 75 Mega samples per second, the reclocking and operation of these A/Ds to permit receive circuit 202 to receive data in accordance with the 100BaseTX standard advantageously does not stress each individual A/D since they are required to sample at a rate that is lower than the rate associated with the base 100BaseT2 standard (i.e., 62.5 Mega samples per second versus 75 Mega samples per second). Advantageously, the reconfiguration of the common denominator transceiver design to support the 100BaseTX standard does not require higher performance analog-to-digital converters, which are more expensive and difficult to design.

Digital switch 238 is employed to combine data from A/D1 output 234 and A/D2 output 236 to supply digital data to DSP receive port Rx_A of DSP 204. Note that data on digital channel 240 is a combination of the data from analog-to-digital converters A/D1 and A/D2.

The combined data on digital channel 240, which is sampled at an effective rate of 125 Mega samples per second, is then input into DSP 204. As mentioned earlier in connection with FIG. 8C, the sampled data may then be filtered and sliced prior to being input into a decoding circuit. This implementation is shown in FIG. 9C.

Alternatively, the sampled data output by analog-to-digital converters A/D1 and A/D2 may be provided to two separate DSP receive ports, e.g., DSP receive ports Rx_A and Rx_B via digital channels 240 and 242, respectively. In other words, configurable digital switch 238 does not, in the implementation of FIG. 9D, combine the outputs of the analog-to-digital converters prior to inputting the sampled data to DSP 204. Within DSP 204, the sampled data received via DSP receive ports Rx_A and Rx_B are then filtered through two separate filters 330 and 332, respectively, prior to being combined via a conventional combining circuit 334. The output of combining circuit 334 is then input into a conventional slicer/decision circuit 302, which removes noise prior to providing the data to an appropriate decoding circuit.

As mentioned earlier, the DSP functions employed to process data transmitted using the 100BaseTX is only a subset of the set of DSP functions available for processing data transmitted in accordance with the 100BaseT2 standard. Consequently, the DSP circuit of the base 100BaseT2 design may advantageously be reused to support the DSP needs of the 100BaseTX configuration.

Transmit circuit 200 works analogously, with data from DSP transmit port TX_A being split by configurable digital switch 250, thereby allowing digital-to-analog converters DAC1 and DAC2 to operate at 62.5 Megahertz. The outputs of digital-to-analog converters DAC1 and DAC2 are combined by configurable analog switch 252 prior to being input into a transmit filter, Tx_Filter A, and put on the transmission channel.

Note that the inventive common denominator transceiver design of FIG. 7A permits the same circuit blocks (e.g., configurable analog switch 214, reclock-enabled analog-to-digital converters A/D1 and A/D2, and configurable digital switch 238 of the receive circuit) of the base 100BaseT2 standard to be reconfigured and re-used for the 100BaseTX standard, thereby maximizing utilization of the resources of the common denominator transceiver design, which lowers implementation cost.

Figure 10A:
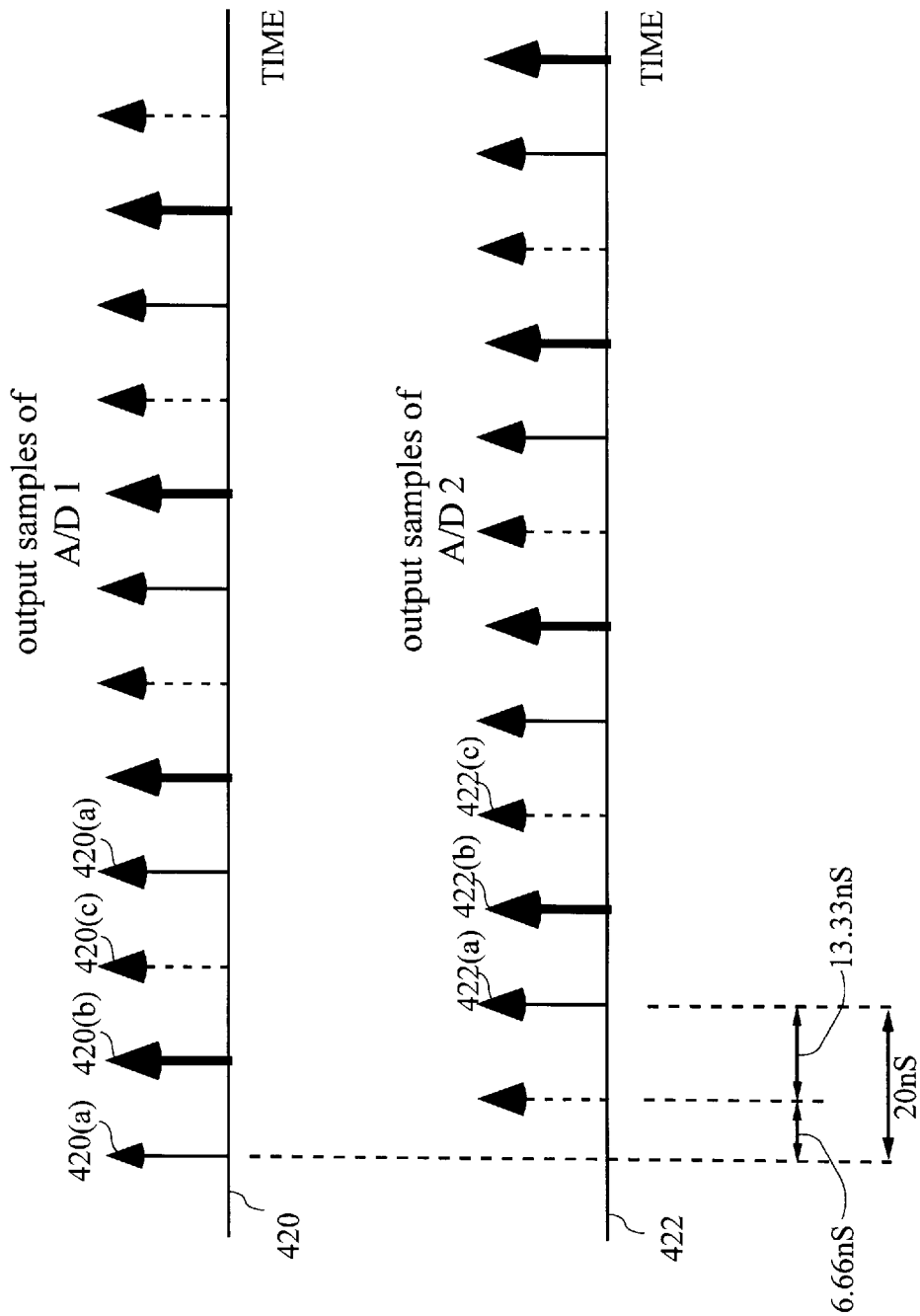
FIG. 10A is a timing diagram illustrating, in accordance with one aspect of the present invention, the outputs of the configurable analog-to-digital converters of the receive circuit when the common denominator transceiver is configured to receive data from the transmission channel using the 100BaseT4 standard.

FIG. 10A is a timing diagram illustrating the output samples of digital-to-analog converters A/D1 and A/D2 when receive circuit 202 is configured to operate in the 100BaseT4 standard. Timeline 420 represents the output samples of analog-to-digital converter A/D1 while timeline 422 shows the output samples of analog-to-digital converter A/D2. As shown in FIG. 10A, analog-to-digital converter A/D1 samples its input and provides an output every 13.333 nanoseconds. In other words, analog-to-digital converter A/D1 operates at 75 Megahertz. Analog-to-digital converter A/D2 also samples its input and provides an output every 13.333 nanoseconds (for a sampling rate of 75 Megahertz).

However, each output sample of analog-to-digital converter A/D2 from a given receive filter is offset from an output sample of analog-to-digital converter A/D1 from that same receive filter by 6.666 nanoseconds. Consequently, when the output samples from A/D1 and A/D2 are combined, the output samples from a given receive filter are 20 nanoseconds apart for an effective sampling rate of 50 Mega samples per second, which is advantageously the required sampling rate for each of the receive filters of the 100BaseT4 standard.

With reference to FIG. 10A, output sample 422(a) of A/D2 is offset from output sample 420(a) of A/D1 (where the subscript "a" denotes data from the same receive filter Rx_Filter A), output sample 422(b) of A/D2 is offset from output sample 420(b) of A/D1 (where the subscript "b" denotes data from the same receive filter Rx_Filter B), output sample 422(c) of A/D2 is offset from output sample 420(c) of A/D1 (where the subscript "c" denotes data from the same receive filter Rx_Filter C).

Figure 10B:
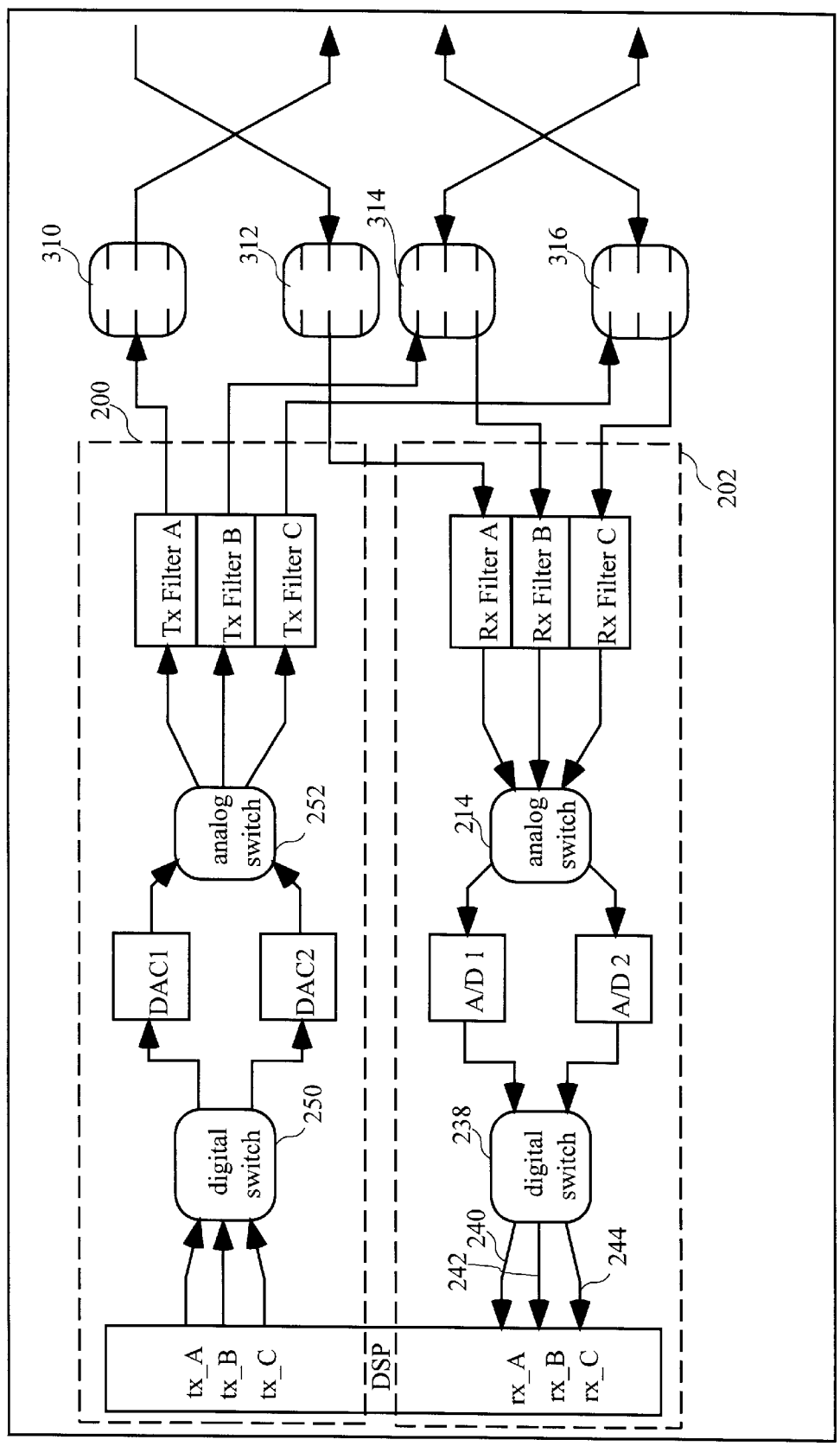
FIG. 10B illustrates, in accordance with one embodiment of the present invention, the common denominator transceiver design of FIG. 7A when configured to transmit and receive data using the 100BaseT4 standard.

FIG. 10B illustrates the common denominator transceiver design of FIG. 7A when configured to transmit and receive data using the 100BaseT4 standard. Transformers 310, 312, 314, and 316, which are employed as conventional to conform the data to the requirements of the 100BaseT4 standard, are also shown to provide context for the inventive configuration of FIG. 10B. As discussed in connection with FIG. 5, the transmission channel of the 100BaseT4 standard typically includes four twisted pairs of wires, two of which are employed in the full duplex mode and the other two in the half duplex mode. Consequently, all three receive filters Rx_Filter A, Rx_Filter B, and Rx_Filter C are employed to receive data from the transmission channel.

With reference to FIG. 10B, for the pair of wires coupled to transformer 310, Tx-Filter A is chosen for the half-duplex transmit. Rx-Filter A is chosen for the half-duplex receiving of data on the pair of wires coupled to transformer 312. Tx-Filter B is chosen for transmitting data on the pair of wires coupled to transformer 314, and Rx_Filter B is chosen for receiving data on the same pair of wires (thereby making this pair full duplex). Tx-Filter C is chosen for transmitting data on the pair of wires coupled to transformer 316, and Rx_Filter C is chosen for receiving data on the same pair of wires (thereby making this pair also full duplex). It will be appreciated by those skilled that the assignment of filters (Rx_Filter A, Rx_Filter B, or Rx_Filter C) for the respective pairs of wires on the transmission channel is arbitrary and specifically mentioned herein to simplify discussion only.

Configurable analog switch 214 is arranged to permit reclock-enabled analog-to-digital converter A/D1 to sample Rx_Filter A, Rx_Filter B, and Rx_Filter C in turn 13.333 ns apart. Configurable analog switch 214 is also arranged to permit reclock-anabled analog-to-digital converter A/D2 to sample Rx_Filter A, Rx_Filter B, and Rx_Filter C in turn 13.333 ns apart. However, a given receive filter, e.g., Rx_Filter A, is sampled by A/D1 and then A/D2 twenty nanoseconds apart (as shown in FIG. 10A). As can be appreciated from the foregoing, each of the two analog-to-digital converters A/D1 and A/D2 sample the three receive filters, Rx_Filter A, Rx_Filter B, and Rx_Filter C at 75 Mega samples per second, giving each receive filter an effective sampling rate of 50 Mega samples per second, which is advantageously the required sampling rate for the 100BaseT4 standard.

Since reclock-enabled analog-to-digital converters A/D1 and A/D2 are designed to operate with the 100BaseT2 standard of the common denominator transceiver design, i.e., at 75 Mega samples per second, the operation of these A/Ds to permit receive circuit 202 to receive data in accordance with the 100BaseT4 standard advantageously does not stress each individual A/D since they are not required to sample at a higher rate than the rate associated with the base 100BaseT2 standard (i.e., 75 Mega samples per second). Advantageously the reconfiguration of the common denominator transceiver design to support the 100BaseT4 standard also does not require higher performance analog-to-digital converters, which are more expensive and difficult to design.

Configurable digital switch 238 is employed to extract the data from each receive filters from the combined data output by A/D1 and A/D2. With reference to FIGS. 10A and 10B and taking an arbitrary starting position to facilitate discussion, digital switch 238 is employed to switch output sample 420(b) from A/D1 to DSP receive port Rx_B, then switch output sample 422(a) to DSP receive port Rx_A, then switch output sample 420(c) to DSP receive port Rx_C, then switch output sample 422(b) to DSP receive port Rx_B, , then switch the next output sample 420(a) to DSP receive port Rx_A, then switch output sample 422(c) to DSP receive port Rx_C, and so on. As before, the control signals for the A/Ds and switches of the common denominator transceiver design may be generated using any conventional digital technique to support the 100BaseT4 standard.

Figure 10C:
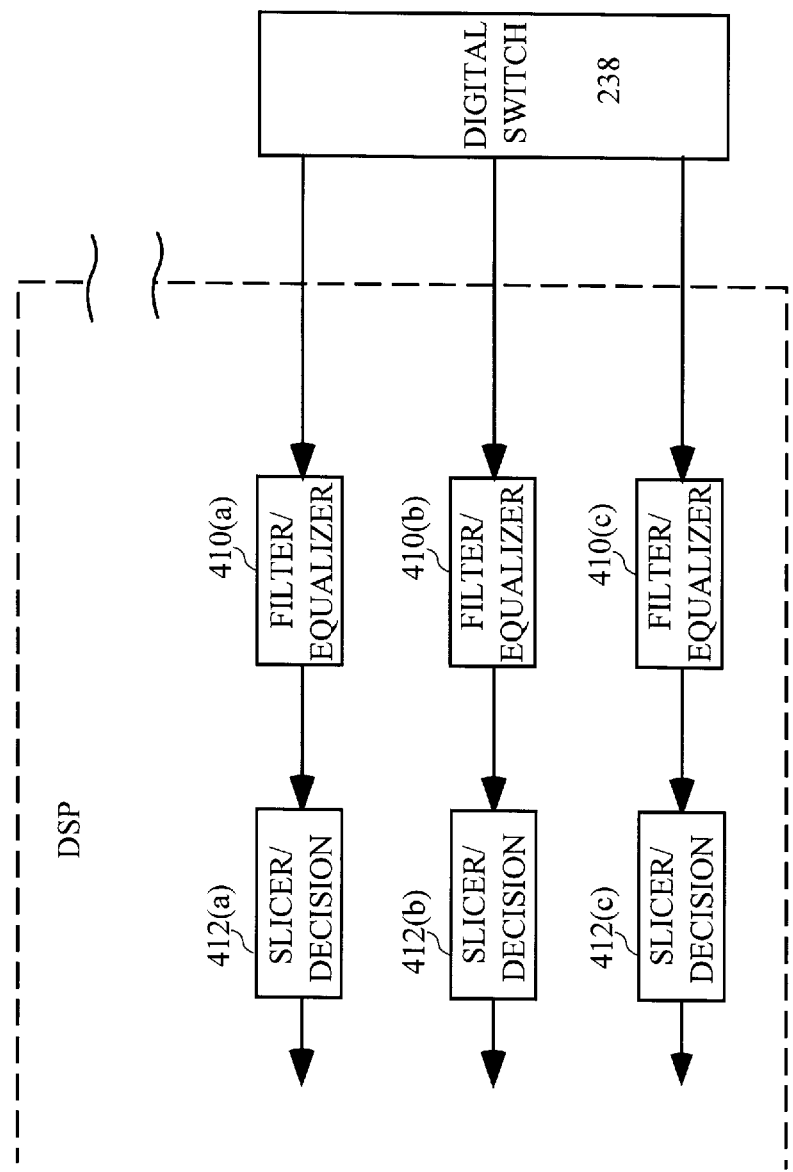
FIG. 10C illustrates, in accordance with one embodiment of the present invention, an implementation of a DSP circuit that works well in receiving 100BaseT4 data from the inventive transceiver.

After inputting into the DSP, the sampled data on receive ports Rx_A, Rx_B, Rx_C may then be filtered and sliced prior to being input into a decoding circuit. This implementation is shown in FIG. 10C wherein sampled data from receive ports Rx_A, Rx_B, Rx_C are filtered via respective filter/equalizer circuits 410(a), 410(b), and 410(c), then sliced via respective slicer/decision circuits 412(a), 412(b), and 412(c). As mentioned earlier, the DSP functions employed to process data transmitted using the 100BaseT4 may only be a subset of the set of DSP functions available for processing data transmitted in accordance with the 100BaseT2 standard. Consequently, the DSP circuit of the base 100BaseT2 design may advantageously be reused to support the DSP needs of the 100BaseT4 configuration.

Transmit circuit 200 works analogously, with digital data from DSP transmit ports TX_A, TX_B, and TX_C being switched by configurable digital switch 250 to DAC1 and DAC2 in a manner analogous to the way which analog switch 214 switches analog data to A/D1 and A/D2 in FIG. 10A. Analog switch 252 extracts analog data from DAC1 and DAC2 in a manner analogous to the way which digital switch 239 extracts digital data from AD/1 and A/D2. The extracted analog data from analog switch 252 are then filtered via respective filters Tx_Filter A, Tx_Filter B, and Tx_Filter C prior to being conditioned by transformers 310, 314, and 316 to transmission on the transmission channel. As before, the control signals for the DACs and switches of the common denominator transceiver design may be generated using any conventional digital technique to support the 100BaseT4 standard.

Note that the inventive common denominator transceiver design of FIG. 7A permits the same circuit blocks (i.e., configurable analog switch 214, reclock-enabled analog-to-digital converters A/D1 and A/D2, and configurable digital switch 238) of the base 100BaseT2 standard to be reconfigured and re-used for the 100BaseT4 standard (as well as the 100BaseTX standard of FIGS. 9A and 9B), thereby minimizing utilization of the resources of the common denominator transceiver design, which lowers implementation cost.

While this invention has been described in terms of several preferred embodiments, there are alterations, permutations, and equivalents which fall within the scope of this invention. For example, although this disclosure specifically discusses the current implementation of the 100BaseT2, 100BaseTX and 100BaseT4 standards, it should be appreciated that the standards may evolve over time yet still be susceptible to application by the present inventive apparatuses and methods. Such evolution is expected and is indeed welcomed as technology advances.

Accordingly, it is contemplated that the present invention may be employed to support data communication in any one of three standards: a first standard, analogous to the current 100BaseT2 standard, employing two bidirectional analog channels and requiring a first sampling rate (e.g., KX 75 Mega Samples per second on each channel), a second standard, analogous to the current 100BaseTX, employing two unidirectional analog channels and requiring a second sampling rate (e.g., KX 125 Mega samples per second on each channel), a third standard, analogous to the current 100BaseT4, employing two unidirectional analog channels and two bidirectional analog channels and requiring a third sampling rate (e.g., KX 50 Mega samples per second). In the discussion above, K is a constant, preferably 1. Each of the two A/Ds of the receiving circuit may then sample its input at the first sampling rate when operating in the first standard, time-shared among the analog channels via the analog switch to sample its input at 1.25 times the second sampling rate when operating in the second standard, or time-shared among the analog channels via the analog switch to sample its input at 1.5 times the third sampling rate when operating in the third standard. Likewise, each of the two DACs of the transmitting circuit may then sample its input at the first sampling rate when operating in the first standard, time-shared among the digital channels via the digital switch to sample its input at 1.25 times the second sampling rate when operating in the second standard, or time-shared among the digital channels via the digital switch to sample its input at 1.5 times the third sampling rate when operating in the third standard.

It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A transceiver for exchanging data with a transmission channel using one of a 100BaseT2, 100BaseTX, and 100BaseT4 standards, comprising:
   a receive circuit for receiving analog data from said transmission channel, including:
      a first analog switch;
      a first analog-to-digital converter coupled to said first analog switch;
      a second analog-to-digital converter coupled to said first analog switch; and
      a second digital switch coupled to said first analog-to-digital converter and to said second analog-to-digital converter, said analog data being switched by said first analog switch into said first analog-to-digital converter and said second analog-to-digital converter to allow said first analog-to-digital converter and said second analog-to-digital converter to support sampling requirements of said one of said 100BaseT2, said 100BaseTX, and said 100BaseT4 standards.

2. The transceiver of claim 1 wherein said 100BaseT2 standard is employed for said exchanging data, said transmission channel includes a first analog channel and a second analog channel, said first analog switch couples said first analog channel to said first analog-to-digital converter, said first analog switch couples said second analog channel to said second analog-to-digital converter.

3. The transceiver of claim 1 wherein said first analog-to-digital converter samples at 75 Mega samples per second.

4. The transceiver of claim 2 wherein said second digital switch couples an output of said first analog-to-digital converter to a first receive port of a digital signal processing circuit and an output of said second analog-to-digital converter to a second receive port of a digital signal processing circuit.

5. The transceiver of claim 1 wherein said 100BaseTX standard is employed for said exchanging data, said transmission channel includes a first analog channel, said first analog switch couples said first analog channel with said first analog-to-digital converter to permit said first analog-to-digital converter to receive a first subset of said analog data from said first analog channel, said first analog switch couples said first analog channel with said second analog-to-digital converter to permit said second analog-to-digital converter to receive a second subset of said analog data from said first analog channel, said second subset of analog data being received in an alternating manner relative to said first subset of said analog data.

6. The transceiver of claim 5 wherein said first analog-to-digital converter samples said first subset of said analog data at 62.5 Mega samples per second and said second analog-to-digital converter samples said second subset of said analog data at 62.5 Mega samples per second.

7. The transceiver of claim 5 wherein said second digital switch couples an output of said first analog-to-digital converter and an output of said second analog-to-digital converter to a first receive port of a digital signal processing circuit to permit said first receive port to receive sampled data from said first analog-to-digital converter and said second analog-to-digital converter in an alternating manner.

8. The transceiver of claim 1 wherein said 100BaseT4 standard is employed for said exchanging data, said transmission channel includes a first analog channel, a second analog channel, and a third analog channel, said first analog switch couples said first analog channel, said second analog channel, and said third analog channel to said first analog-to-digital converter to permit said first analog-to-digital converter to receive in turn a first subset of analog data from said first analog channel, a first subset of analog data from said second analog channel, a first subset of analog data from said third analog channel, said first analog switch couples said first analog channel, said second analog channel, and said third analog channel to said second analog-to-digital converter to permit said second analog-to-digital converter to receive in turn a second subset of analog data from said first analog channel, a second subset of analog data from said second analog channel, a second subset of analog data from said third analog channel.

9. The method of claim 8 wherein said first subset of analog data from said first analog channel is offset from said second subset of analog data from said first analog channel by 20 nanoseconds.

10. A transceiver for exchanging data with a transmission channel using one of a 100BaseT2, 100BaseTX, and 100BaseT4 standards, comprising:
a transmit circuit for converting digital data to analog data for transmission on said transmission channel using said one of said standards, including:
a first a switch;
a first digital-to-analog converter coupled to said first digital switch;
a second digital-to-analog converter coupled to said first digital switch; and
a second analog switch coupled to said first digital-to-analog converter and to said second digital-to-analog converter, said digital data being switched by said first digital switch into said first digital-to-analog converter and said second digital-to-analog converter to allow said first digital-to-analog converter and said second digital-to-analog converter to support sampling requirements of said one of said 100BaseT2, said 100BaseTX, and said 100BaseT4 standards.

11. The transceiver of claim 10 wherein said 100BaseT2 standard is employed for said exchanging data, said digital data being received on a first digital channel and a second digital channel, said first digital switch couples said first digital channel to said first digital-to-analog converter, said first digital switch couples said second digital channel to said second digital-to-analog converter.

12. The transceiver of claim 11 wherein each of said first digital-to-analog converter and said second digital-to-analog converter operates at 75 Megahertz.

13. The transceiver of claim 10 wherein said 100BaseTX standard is employed for said exchanging data, said digital data being received on a first digital channel, said first digital switch couples said first digital channel to said first digital-to-analog converter and said second digital-to-analog converter in an alternating manner.

14. The transceiver of claim 13 wherein said first digital-to-analog converter operates at 62.5 Megahertz and said second digital-to-analog converter operates at 62.5 Megahertz.

15. The transceiver of claim 14 wherein said second analog switch combines an output of said first digital-to-analog converter and an output of said second digital-to-analog converter.

16. The transceiver of claim 10 wherein said 100BaseT4 standard is employed for said exchanging data, said digital data being received on a first digital data channel, a second digital data channel, and a third digital data channel, said first digital switch is configured to permit said first digital-to-analog converter to receive in turn a first subset of digital data from said first digital data channel, a first subset of digital data from said second digital data channel, a first subset of digital data from said third digital data channel, said first digital switch is configured to permit said second digital-to-analog converter to receive in turn a second subset of digital data from said first digital data channel, a second subset of digital data from said second digital data channel, a second subset of digital data from said third digital data channel.

17. The transceiver of claim 16 wherein said first subset of digital data from said first digital data channel is offset from said second subset of digital data from said second digital data channel.

18. A method for exchanging data with a transmission channel using one of a 100BaseT2, 100BaseTX and 100BaseT4 standards, comprising:
receiving analog data from said transmission channel;
switching said received analog data through a configurable analog switch;
converting first analog data from said configurable analog switch to first digital data using a first reclock-enabled analog-to-digital converter;
converting second analog data from said configurable analog switch to second digital data using a second reclock-enabled analog-to-digital converter;
coupling said first digital data and said second digital data to a digital signal processing circuit using a configurable digital switch coupled to said first analog-to-digital converter and said second analog-to-digital converter; and
performing signal processing on at least one of said first digital data and said second digital data received via said configurable digital switch.

19. The method of claim 18 wherein said 100BaseT2 standard is employed for said exchanging data, said transmission channel includes a first analog channel and a second analog channel, said switching said received analog data further comprises coupling said first analog channel with said first reclock-enabled analog-to-digital converter to allow said first reclock-enabled analog-to-digital converter to receive analog data from said first analog channel as said first analog data, and coupling said second analog channel with said second reclock-enabled analog-to-digital converter to allow said second reclock-enabled analog-to-digital converter to receive analog data from said second analog channel as said second analog data.

20. The apparatus of claim 19 wherein said converting said first analog data further comprising sampling said first analog data at a sampling rate of 75 Mega samples per second and wherein converting said second analog data further comprising sampling said second analog data at said sampling rate of 75 Mega samples per second.

21. The apparatus of claim 20 wherein said coupling said first digital data and said second digital data to said digital signal processing circuit using said configurable digital switch further comprises receiving at a first receive port of said digital signal processing circuitry said first digital data, and receiving at a second receive port of said digital signal processing circuitry said second digital data.

22. The method of claim 18 wherein said 100BaseTX standard is employed for said exchanging data, said transmission channel includes a first analog channel, said switching said received analog data further comprises coupling said first analog channel with said first reclock-enabled analog-to-digital converter to allow said first reclock-enabled analog-to-digital converter to receive a first subset of said analog data from said first analog channel as said first analog data, and said switching said received analog data further comprises coupling said second analog channel with said second reclock-enabled analog-to-digital converter to allow said second reclock-enabled analog-to-digital converter to receive a second subset of said analog data from said second analog channel as said second analog data, said second subset of analog data being received in an alternating manner relative to said first subset of analog data.

23. The method of claim 22 wherein said converting said first analog data further comprising sampling said first analog data at a sampling rate of 75 Mega samples per second, and wherein said converting said second analog data further comprising sampling said second analog data at said sampling rate of 75 Mega samples per second.

24. The method of claim 23 wherein said coupling said first digital data and said second digital data to said digital signal processing circuit either comprises receiving at a first receive port of said digital signal processing circuitry said first digital data and said second digital data in a combined maimer.

25. The method of claim 18 wherein said 100BaseT4 standard is employed for said exchanging data, said transmission channel includes a first analog channel, a second analog channel, and a third analog channel, said switching said received analog data further comprises coupling said first analog channel, said second analog channel, and said third analog channel with said first reclock-enabled analog-to-digital converter to permit said first reclock-enabled analog-to-digital converter to receive in turn as said first analog data a first subset of analog data from said first analog data channel, a first subset of analog data from said second analog data channel, a first subset of analog data from said third analog data channel, said switching said received analog data for comprises coupling said first analog channel, said second analog channel and said third analog channel with said second reclock-enabled analog-to-digital converter to permit said second reclock-enabled analog-to-digital converter to receive in turn as said second analog data a second subset of analog data from said first analog data channel, a second subset of analog data from said second analog data channel, a second subset of analog data from said third analog data channel.

26. The method of claim 25 wherein said first subset of analog data from said first analog data channel is offset from said second subset of analog data from said second analog data channel by 20 nanoseconds.

27. An apparatus for exchanging data with a transmission channel using one of a 100BaseT2, 100BaseTX and 100BaseT4 standards, comprising:

a receive circuit for receiving analog data from said transmission channel, including
a configurable analog switch arranged to receive data from said transmission channel;
a first reclock-enabled analog-to-digital converter coupled to said configurable analog switch, said first reclock-enabled analog-to-digital converter being configured to receive first analog data from said configurable analog switch and converting said first analog data to first digital data;
a second reclock-enabled analog-to-digital converter coupled to said configurable analog switch, said second reclock-enabled analog-to-digital converter being configured to receive second analog data from said configurable analog switch and converting said second analog data to second digital data;
a configurable digital switch coupled to said first analog-to-digital converter and said second analog-to-digital converter; and
digital signal processing circuitry coupled to said configurable digital switch, said digital signal processing circuitry performs signal processing on at least one of said first digital data and said second digital data received via said configurable digital switch.

28. The apparatus of claim 27 wherein said 100BaseT2 standard is employed for said exchanging data,
said transmission channel includes a first analog channel and a second analog channel,
said configurable analog switch couples analog data from said first analog channel with said first reclock-enabled analog-to-digital converter to allow said first reclock-enabled analog-to-digital converter to receive said analog data from said first analog channel as said first analog data, and
said configurable analog switch couples analog data from said second analog channel with said second reclock-enabled analog-to-digital converter to allow said second reclock-enabled analog-to-digital converter to receive said analog data from said second analog channel as said second analog data.

29. The apparatus of claim 28 wherein each of said first analog-to-digital converter and said second analog-to-digital converter samples respectively said first analog data and said second analog data at a sampling rate of 75 Mega samples per second.

30. The apparatus of claim 29 wherein said configurable digital switch is configured to permit a first receive port of said digital signal processing circuitry to receive said first digital data, and
said configurable digital switch is configured to permit a second receive port of said digital signal processing circuitry to receive said second digital data.

31. The apparatus of claim 27 wherein said 100BaseTX standard is employed for said exchanging data, said transmission channel includes a first analog channel, said configurable analog switch couples said first analog channel with said first reclock-enabled analog-to-digital converter to allow said first reclock-enabled analog-to-digital converter to receive a first subset of said analog data from said first analog channel as said first analog data, and said configurable analog switch couples said first analog channel with said second reclock-enabled analog-to-digital converter to allow said second reclock-enabled analog-to-digital converter to receive a second subset of said analog data from said first analog channel as said second analog data, said second subset of analog data being received in an alternating manner relative to said first subset of said analog data.

32. The apparatus of claim 31 wherein each of said first analog-to-digital converter and said second analog-to-digital converter samples respectively said first analog data and said second analog data at a sampling rate of 62.5 Mega samples per second.

33. The apparatus of claim 32 wherein said configurable digital switch is configured to permit a first receive port of said digital signal processing circuitry to receive said first digital data and said second digital data, said first digital data and said second digital data are received in a combined manner.

34. The apparatus of claim 27 wherein said 100BaseT4 standard is employed for said exchanging data, said transmission channel includes a first analog channel, a second analog channel, and a third analog data channel, said configurable analog switch couples said first analog channel said second analog channel, and said third analog channel with said first reclock-enabled analog-to-digital converter to permit said first reclock-enabled analog-to-digital converter to receive, in turn, as said first analog data a first subset of analog data from said first analog data channel, a first subset of analog data from said second analog data channel, and a first subset of analog data from said third data channel, and said configurable analog switch couples said first analog channel, said second analog channel, and said third analog channel with said second reclock-enabled analog-to-digital converter to permit said second reclock-enabled analog-to-digital converter to receive, in turn, as said second analog data a second subset of analog data from said first analog data channel, a second subset of analog data from said second analog data channel, and a second subset of analog data from said third data channel.

35. The apparatus of claim 34 wherein said first subset of analog data from said first analog data channel is offset from said second subset of analog data from said first data channel by 20 nanoseconds, said first subset of analog data from said second analog data channel is offset from said second subset of analog data from said second data channel by 20 nanoseconds, and said first subset of analog data from said third analog data channel is offset from said second subset of analog data from said third data channel by 20 nanoseconds.

36. The apparatus of claim 35 wherein each of said first analog-to-digital converter and said second analog-to-digital converter samples respectively said first analog data and said second analog data at a sampling rate of 50 Mega samples per second.

37. The apparatus of claim 36 wherein said configurable digital switch is configured to permit a first receive port of said digital signal processing circuitry to receive from both said first analog-to-digital converter and said second analog-to-digital converter a first received digital data, to permit a second receive port of said digital signal processing circuitry to receive from both said first analog-to-digital converter and said second analog-to-digital converter a second received digital data, and to permit a third receive port of said digital signal processing circuitry to receive from both said first analog-to-digital converter and said second analog-to-digital converter a third received digital data, said first received digital data substantially representing a digital version of said analog data received on said first data channel, said second received digital data substantially representing a digital version of said analog data received on said second data channel, said third received digital data substantially representing a digital version of said analog data received on said third data channel.

38. The apparatus of claim 28 further comprising control circuitry coupled to said configurable analog switch, said first reclock-enabled analog-to-digital converter, said second reclock-enabled analog-to-digital converter, and said configurable digital switch to reconfigure said configurable analog switch and said configurable digital switch and to reclock said first reclock-enabled analog-to-digital converter and said second reclock-enabled analog-to-digital converter to support individual ones of said standards.

39. A transceiver for exchanging data with a transmission channel using one of a first standard, a second standard, and a third standard, said first standard employing a first set of analog channels consisting essentially of two bidirectional analog channels and requiring a first sampling rate, a second standard employing a second set of analog channels consisting essentially of two unidirectional analog channels and requiring a second sampling rate, a third standard employing a third set of analog channels consisting essentially of two unidirectional analog channels and two bidirectional analog channels and requiring a third sampling rate, comprising:

a receive circuit for receiving analog data from said transmission channel, including:
a first analog switch;
a first analog-to-digital converter coupled to said first analog switch;
a second analog-to-digital converter coupled to said first analog switch; and
a second digital switch coupled to said first analog-to-digital converter and to said second analog-to-digital converter, said analog data being switched by said first analog switch into said first analog-to-digital converter and said second analog-to-digital converter to allow said first analog-to-digital converter and said second analog-to-digital converter to support sampling requirements of said one of said first, second, and third standards.

40. The apparatus of claim 39 wherein said first standard is employed for said exchanging data, said first analog-to-digital converter being coupled to a first one of said two bidirectional analog channels of said first set of analog channels via said first analog switch, said second analog-to-digital converter being coupled to a second one of said two bidirectional analog channels of said first set of analog channels via said first analog switch, each of said first analog-to-digital converter and said second analog-to-digital converter sampling its respective input at the sampling rate required by said third standard.

41. The apparatus of claim 39 wherein said second standard is employed for said exchanging data, said first analog-to-digital converter and said second analog-to-digital converter being coupled, in an alternating manner, to one of said two unidirectional analog channels of said second set of analog channels via said first analog switch, each of said first analog-to-digital converter and said second analog-to-digital converter sampling alternate subsets of analog data from said one of said two unidirectional analog channels of said second set of analog channels 1.25 times the sampling rate required by said second standard.

42. The apparatus of claim 39 wherein said third standard is employed for said exchanging data, said first analog-to-digital converter and said second analog-to-digital converter being time shared between said two unidirectional channels and said two bidirectional channels of said third set of analog channels, each of said first analog-to-digital converter and said second analog-to-digital converter sampling its respective input at 1.5 times the sampling rate required by said third standard.

43. A transceiver for exchanging data with a transmission channel using one of a 100BaseT2, and 100BaseTX standards, comprising:
- a receive circuit for receiving analog data from said transmission channel, including:
  - a first analog switch;
  - a first analog-to-digital converter coupled to said first analog switch;
  - a second analog-to-digital converter coupled to said first analog switch; and
  - a second digital switch coupled to said first analog-to-digital converter and to said second analog-to-digital converter, said analog data being switched by said first analog switch into said first analog-to-digital converter and said second analog-to-digital converter to allow said first analog-to-digital converter and said second analog-to-digital converter to support sampling requirements of said one of said 100BaseT2 and said 100BaseTX standards.

44. A transceiver for exchanging data with a transmission channel using one of a 100BaseT2, and 100BaseT4 standards, comprising:
- a receive circuit for receiving analog data from said transmission channel, including:
  - a first analog switch;
  - a first analog-to-digital converter coupled to said first analog switch;
  - a second analog-to-digital converter coupled to said first analog switch; and
  - a second digital switch coupled to said first analog-to-digital converter and to said second analog-to-digital converter, said analog data being switched by said first analog switch into said first analog-to-digital converter and said second analog-to-digital converter to allow said first analog-to-digital converter and said second analog-to-digital converter to support sampling requirements of said one of said 100BaseT2 and said 100BaseT4 standards.

45. A transceiver for exchanging data with a transmission channel using one of a 100BaseT4, and 100BaseTX standards, comprising:
- a receive circuit for receiving analog data from said transmission channel, including:
  - a first analog switch;
  - a first analog-to-digital converter coupled to said first analog switch;
  - a second analog-to-digital converter coupled to said first analog switch; and
  - a second digital switch coupled to said first analog-to-digital converter and to said second analog-to-digital converter, said analog data being switched by said first analog switch into said first analog-to-digital converter and said second analog-to-digital converter to allow said first analog-to-digital converter and said second analog-to-digital converter to support sampling requirements of said one of said 100BaseT4 and said 100BaseTX standards.

* * * * *